US010735800B2

(12) United States Patent
Ma et al.

(10) Patent No.: US 10,735,800 B2
(45) Date of Patent: *Aug. 4, 2020

(54) RENDERING CONTENT AND TIME-SHIFTED PLAYBACK OPERATIONS FOR PERSONAL OVER-THE-TOP NETWORK VIDEO RECORDER

(71) Applicant: Ericsson AB, Stockholm (SE)

(72) Inventors: Kevin J. Ma, Nashua, NH (US); Robert Hickey, Bedford, MA (US); Paul Tweedale, Andover, MA (US); Prabhudev Navali, Westford, MA (US); Man Li, Bedford, MA (US); Daniel Biagini, Bolton, MA (US)

(73) Assignee: Ericsson AB, Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 15/443,118

(22) Filed: Feb. 27, 2017

(65) Prior Publication Data
US 2017/0171590 A1 Jun. 15, 2017

Related U.S. Application Data

(63) Continuation of application No. 14/157,710, filed on Jan. 17, 2014, now Pat. No. 9,584,847.
(Continued)

(51) Int. Cl.
H04N 7/10 (2006.01)
H04N 7/025 (2006.01)
(Continued)

(52) U.S. Cl.
CPC ....... *H04N 21/4147* (2013.01); *H04L 65/608* (2013.01); *H04N 21/2187* (2013.01);
(Continued)

(58) Field of Classification Search
CPC ......... H04N 21/4147; H04N 21/26258; H04N 21/2668; H04N 21/2747; H04N 21/47217;
(Continued)

(56) References Cited

U.S. PATENT DOCUMENTS

| 8,184,952 B2 | 5/2012 | Sandoval |
| 9,066,138 B1 | 6/2015 | Kraiman et al. |

(Continued)

FOREIGN PATENT DOCUMENTS

| WO | 2012114107 A2 | 8/2012 |
| WO | 2013017165 A1 | 2/2013 |

OTHER PUBLICATIONS

Fecheyr-Lippens, "A Review of HTTP Live Streaming", XP-002638990, Jan. 2010, pp. 1-37.
(Continued)

*Primary Examiner* — Nnenna N Ekpo
(74) *Attorney, Agent, or Firm* — Sage Patent Group

(57) ABSTRACT

Live streaming video content is processed and stored for real-time delivery of the content, future VoD viewing of the content, and time-shifted viewing of the content, by manipulating a common manifest or playlist. Previously stored content may be reordered and/or recombined in order to provide a personalized content viewing experience.

10 Claims, 7 Drawing Sheets

Related U.S. Application Data

(60) Provisional application No. 61/763,634, filed on Feb. 12, 2013.

(51) Int. Cl.

| | | |
|---|---|---|
| *H04N 21/4147* | (2011.01) | |
| *H04N 21/2343* | (2011.01) | |
| *H04N 21/262* | (2011.01) | |
| *H04N 21/845* | (2011.01) | |
| *H04N 21/8547* | (2011.01) | |
| *H04N 21/231* | (2011.01) | |
| *H04N 21/2747* | (2011.01) | |
| *H04N 21/433* | (2011.01) | |
| *H04N 21/435* | (2011.01) | |
| *H04N 21/2668* | (2011.01) | |
| *H04L 29/06* | (2006.01) | |
| *H04N 21/2187* | (2011.01) | |
| *H04N 21/472* | (2011.01) | |
| *H04N 21/81* | (2011.01) | |

(52) U.S. Cl.
CPC ..... *H04N 21/231* (2013.01); *H04N 21/23109* (2013.01); *H04N 21/23439* (2013.01); *H04N 21/2668* (2013.01); *H04N 21/26258* (2013.01); *H04N 21/2747* (2013.01); *H04N 21/435* (2013.01); *H04N 21/4334* (2013.01); *H04N 21/47217* (2013.01); *H04N 21/812* (2013.01); *H04N 21/8455* (2013.01); *H04N 21/8456* (2013.01); *H04N 21/8547* (2013.01)

(58) Field of Classification Search
CPC ............ H04N 21/812; H04N 21/8455; H04N 21/8456; H04N 21/8547; H04L 65/608; H04L 1/829; H04L 1/1832; H04L 1/1867; H04L 1/187
USPC .......................................................... 725/32
See application file for complete search history.

(56) References Cited

U.S. PATENT DOCUMENTS

| | | | |
|---|---|---|---|
| 2005/0074063 A1* | 4/2005 | Nair ................... G11B 20/1262 | 375/240.11 |
| 2007/0106762 A1* | 5/2007 | Kim ........................ H04N 5/76 | 709/219 |
| 2007/0220580 A1 | 9/2007 | Putterman et al. | |
| 2008/0134258 A1 | 6/2008 | Goose et al. | |
| 2008/0195746 A1 | 8/2008 | Bowra et al. | |
| 2009/0228942 A1* | 9/2009 | Brelivet ............... H04N 7/17336 | 725/109 |
| 2009/0293092 A1* | 11/2009 | Guo ................... H04N 7/17318 | 725/98 |
| 2010/0011061 A1 | 1/2010 | Hudson et al. | |
| 2010/0058405 A1 | 3/2010 | Ramakrishnan et al. | |
| 2010/0169453 A1* | 7/2010 | Biderman .......... H04N 7/17318 | 709/217 |
| 2010/0242079 A1 | 9/2010 | Riedl et al. | |
| 2011/0083073 A1* | 4/2011 | Atkins ............... H04N 21/4147 | 715/704 |
| 2011/0246563 A1* | 10/2011 | Keum ................. H04N 7/17318 | 709/203 |
| 2011/0264727 A1 | 10/2011 | Keum et al. | |
| 2011/0307781 A1 | 12/2011 | Sood et al. | |
| 2011/0321114 A1 | 12/2011 | Newell | |
| 2012/0030704 A1 | 2/2012 | Schiller et al. | |
| 2012/0042090 A1 | 2/2012 | Chen et al. | |
| 2012/0110141 A1 | 5/2012 | Biderman et al. | |
| 2012/0110627 A1* | 5/2012 | Reitmeier ................ H04N 5/76 | 725/93 |
| 2012/0216118 A1 | 8/2012 | Lin et al. | |
| 2012/0297431 A1* | 11/2012 | Wang .................. H04N 21/2181 | 725/92 |
| 2013/0247098 A1* | 9/2013 | Ohya ................... H04N 21/435 | 725/38 |
| 2014/0165120 A1 | 6/2014 | Losev et al. | |
| 2014/0189139 A1* | 7/2014 | Cheng ..................... H04L 65/60 | 709/231 |
| 2014/0195651 A1* | 7/2014 | Stockhammer .. H04N 21/23439 | 709/219 |
| 2014/0369666 A1* | 12/2014 | Clevenger ................ H04N 5/76 | 386/241 |

OTHER PUBLICATIONS

Cranor et al., "Design and Implementation of a Distributed Content Management System", XP-002392307, NOSSDAV'03, Jun. 1-3, 2003, pp. 4-11.

RGB Networks. Inc., "Adaptive Streaming Ad Insertion-Modifying Playlists to Deliver Targeted Ads Using HTTP Adaptive Streaming", White Paper, XP-002722836, 2011, pp. 1-8.

Lee et al., "DASH Evaluation Experiment #1: Compositions of Media Presentation(CMP) Proposal Comparison", ISO/IEC JTC1/SC29/WG11, Oct. 15, 2010, China, pp. 1-56.

Lee et al., "DASH Evaluation Experiment #2: MPD Modification, Corrections, and Extension", ISO/IEC JTC1/SC29/WG11, Sep. 10, 2010, China, pp. 1-22.

\* cited by examiner

RENDERING CONTENT AND TIME-SHIFTED PLAYBACK OPERATIONS FOR PERSONAL OVER-THE-TOP NETWORK VIDEO RECORDER

PRIORITY AND CROSS-REFERENCE TO RELATED APPLICATION(S)

This application is a continuation application of the following commonly assigned patent application: (i) "RENDERING CONTENT FOR PERSONAL OVER-THE-TOP NETWORK VIDEO RECORDER," application Ser. No.: 14/157,710, filed Jan. 17, 2014, in the name(s) of Kevin J. Ma et al.; which claims priority based upon the following prior U.S. provisional patent application(s): (i) "METHOD AND SYSTEM FOR PERSONAL OVER-THE-TOP NETWORK VIDEO RECORDER," Application No.: 61/763,634, filed Feb. 12, 2013, in the name(s) of Kevin J. Ma et al.; each of which foregoing nonprovisional and/or provisional applications is hereby incorporated by reference in its entirety.

BACKGROUND

This invention relates in general to over-the-top (OTT) media delivery.

One known technique for OTT media delivery employs segmentation of media objects and the use of playlists or "manifests" by clients (or their proxies) to retrieve the segments in an ordered manner for local client playback of the media object. Among other benefits, segment-based delivery can more easily be provided by general-purpose and widely implemented network protocols such as HTTP, avoiding various costs and complexities that accompany more specialized media delivery protocols.

SUMMARY

Disclosed is a technique for one-time processing of live streaming content for use with real-time delivery, time-shifted delivery, and future video on demand (VoD) delivery. The technique may be referred to generally as a "network personal video recorder" or "npvr". In particular, the disclosed technique employs a client-side proxy that makes heavy use of manifests to provide the various delivery functions to a client device. Certain commonalities among different delivery modes are taken advantage of in the use of the manifests, so that manifest manipulation functions can be leveraged across different uses in operation.

In particular, a method is disclosed for server-side processing of content to support network personal video recorder functions. The method includes continually performing steps of (i) acquiring real-time streaming source content containing a program, (ii) transcoding the acquired source content into distinct encodings to create respective content streams, and (iii) segmenting the content streams into segments and uploading the segments to one or more content delivery networks (CDNs) for retrieval and use in rendering the program at a media player. Here "program" refers to a section of a live streaming content. It may or may not correspond to a "program" in the usual sense, e.g., a television show, etc. Program boundaries can be detected by various means, including in-band SCTE-35 cue tones, out-of-band signals, etc.

The method further includes generating manifests for the program and continually updating the manifests and uploading the updated manifests to the CDNs as the segments are uploaded to the CDNs. The manifests include a master manifest and set of network-personal-video-recorder (npvr) manifests for respective ones of the encodings, where the master manifest includes references to the set of npvr manifests to enable selection from among the encodings in rendering the program at the media player, and the npvr manifests are progressively growing non-sliding-window manifests updated as new segments are uploaded.

Upon detecting a program boundary of the program in the source content, a current set of npvr manifests are completed in current directories of the CDNs. Then new directories are created in the CDNs and a new set of npvr manifests are started in the new directories. Subsequent segments and npvr manifest updates are uploaded to the new directories.

Also disclosed is a client-side method for rendering content that is available in one or more distinct encodings each including a respective set of sequential segments. The method includes proxying a manifest request from a media player to a content server, selecting a preferred encoding for requested content to be delivered, determining a set of npvr manifests required to satisfy the content request and obtaining a selected one or more of the set of npvr manifests associated with the selected encoding, the npvr manifests specifying locations of segments of the respective encodings. A variant manifest is also created from the selected npvr manifest and provided to the media player for use in obtaining the segments of the respective encoding for playback of the content. Different types of variant manifest may be employed to support different functionality, including a sliding-window type of variant manifest (i.e., generated from an npvr manifest) for live streaming or time-shifted playback. A non-sliding-window type of variant manifest (i.e., a modified version of the npvr manifest) can be used to support delivery of prerecorded media, e.g., video on demand.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

In the description herein for embodiments, numerous specific details are provided, such as examples of components and/or methods, to provide a thorough understanding.

One skilled in the relevant art will recognize, however, that an embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments.

Figure 1:
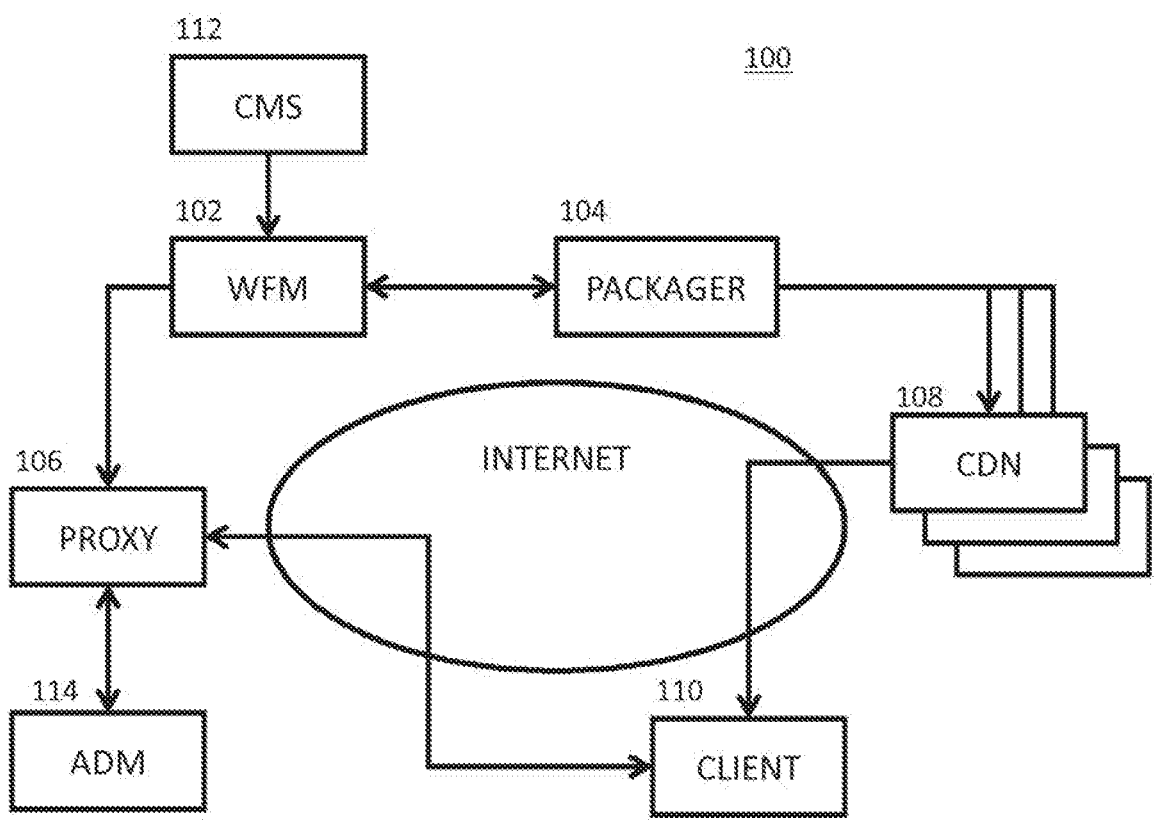
FIG. 1 is a block diagram of a system which is capable of conducting end-to-end content delivery procedures, in accordance with various embodiments.

In FIG. 1 is a block diagram for one embodiment of a system 100. The system has a plurality of network-connected components including a workflow manager (WFM) 102, media processing server or "packager" 104, streaming proxy 106, content delivery network(s) (CDNs) 108, client media player or "client" 110, and content management system (CMS) 112. It also includes an advertisement decision manager (ADM) 114 having a connection to the proxy 106. In the illustrated embodiment, the proxy 106 is separate from the client 110—it may be located in a server-type of computer distinct from the client-type of computer (personal computer, etc.) in which the client 110 is located. In an alternative embodiment described below, the proxy 106 may be included as part of the client 110.

In general, the system operates to deliver content from the CDNs 108 to the client 110 using a segment-based content delivery mechanism, such as HTTP Live Streaming (HLS), Dynamic Adaptive Streaming over HTTP (DASH), Smooth-Streaming, or any other HTTP Adaptive Streaming (HAS) protocol, as should be known by those skilled in the art. The term "segment-based" should be understood to mean a unit of video data smaller than the full duration or length of the video. While the semantic distinction between "segment" files and "fragments" within a file should be known to those skilled in the art, the term "segment" used here should be understood to apply equally to segment, fragment, chunk, etc. (as described by a given protocol)—partial video data units derived from a longer piece of content. The client 110 requests segments as described by a playlist or "manifest" as generally known in the art. As described in detail below, the proxy 106 is heavily involved in the creation and use of manifests to provide certain playback functions to the client 110.

The workflow manager (WFM) 102 receives a real-time streaming content ingestion request from the content management system (CMS) 112. The WFM 102 instructs the packager 104 to begin processing the real-time streaming content, transcoding the content into a plurality of distinct encodings (e.g., audio or video at different bitrates/frame rates/resolutions, audio in different languages or subtitles, or different encryption algorithms and keys) as defined by the CMS 112 and configured through the WFM 102, segmenting the individual bitrate streams, encrypting the segments, and uploading the segments to a plurality of content delivery networks (CDNs) 108.

The media processing server 104 (referred to herein as packager 104) generates a master manifest from the encoding configuration received from the WFM 102. The packager 104 generates variant manifests for each encoding (referred to herein as npvr manifests). The npvr manifest for a given encoding is a non-sliding-window manifest that is updated as each segment for the encoding is generated. The segment is uploaded and then the npvr manifest is also uploaded. The npvr manifest grows in size until the program is complete. When the program completes, the manifest is finalized and a new program directory and new npvr manifest are created for the next program. Each new manifest contains a pointer to the previous sequential npvr manifest. When a manifest is finalized it is updated with a pointer to the next sequential npvr manifest.

The term "program" is used herein primarily to describe a section of a live streaming content corresponding to an npvr manifest. It may or may not correspond to a "program" in the usual sense, e.g., a television show, etc. In one embodiment program boundaries are detected via in-band SCTE-35 cue tones. In another embodiment, program boundaries are detected based on out-of-band SCTE-118 or proprietary electronic program guide (EPG) protocol data. In another embodiment, program boundaries are generated periodically using a fixed program duration (e.g., every 30 minutes). In another embodiment, programs may be defined by a user by providing a fixed time range (e.g., specifying the start and end time for a recording or the start time and a duration for the recording). There are multiple ways to define program boundaries as should be known to those skilled in the art. It should be understood that any method of program boundary detection may be applied to the current invention.

In one embodiment, the initial npvr manifest for a new program having only one segment may look as follows, using an M3U8 format:

EXTM3U
EXT-X-TARGETDURATION:10
EXT-X-VERSION:4
EXT-X-MEDIA-SEQUENCE:1000
EXT-X-KEY:METHOD=AES-128, URI=http://localhost/key-100
EXT-X-DISCONTINUITY:TYPE="PGM",PID="Y"
EXT-AZK-CHAIN:PREV="http://cdn1.example.com/1/2013/02/01/001-X/index.m3u8"
EXT-AZK-SEG:TIME="2013-02-01T19:00:00", KEY="key-100",RATING="PG"
EXTINF:10.0, http://cdn1.example.com/1/2013/02/01/002-Y/seg-01000.ts The npvr manifest is initialized with program information and a pointer to the previous npvr manifest.

In one embodiment, wall-clock timestamp information is included as a comment for each segment. In one embodiment, encryption key ID information is included as a comment for each segment. In one embodiment, rating information is included as a comment for each segment. There are many ways to represent wall-clock time, key information, and rating information, as should be known to those skilled in the art. Any valid representation for wall-clock time, key information, and rating information should be considered valid for use with the current invention.

Continuing the example for the above described embodiment, after ten seconds (one segment duration), the npvr manifest would be updated with a second segment and look as follows:

EXTM3U
EXT-X-TARGETDURATION:10
EXT-X-VERSION:4
EXT-X-MEDIA-SEQUENCE:1000
EXT-X-KEY:METHOD=AES-128, URI=http://localhost/key-100
EXT-X-DISCONTINUITY:TYPE="PGM", PID="Y"
EXT-AZK-CHAIN:PREV="http://cdn1.example.com/1/2013/02/01/001-X/index.m3u8"
EXT-AZK-SEG:TIME="2013-02-01T19:00:00", KEY="key-100",RATING="PG"
EXTINF:10.0, http://cdn1.example.com/1/2013/02/01/002-Y/seg-01000.ts
EXT-AZK-SEG:TIME="2013-02-01T19:00:10", KEY="key-100",RATING="PG"
EXTINF:10.0, http://cdn1.example.com/1/2013/02/01/002-Y/seg-01001.ts Continuing the example for the above described embodiment, once the program completes 599 segments later, the completed manifest would look as follows:

EXTM3U
EXT-X-TARGETDURATION:10
EXT-X-VERSION:4
EXT-X-MEDIA-SEQUENCE:1000
EXT-X-KEY:METHOD=AES-128, URI=http://localhost/key-100
EXT-X-DISCONTINUITY:TYPE="PGM", PID="Y"
EXT-AZK-CHAIN:PREV="http://cdn1.example.com/1/2013/02/01/001-X/index.m3u8"
EXT-AZK-SEG:TIME="2013-02-01T19:00:00", KEY="key-100",RATING="PG"
EXTINF:10.0, http://cdn1.example.com/1/2013/02/01/002-Y/seg-01000.ts
EXT-AZK-SEG:TIME="2013-02-01T19:00:10", KEY="key-100",RATING="PG"
EXTINF:10.0, http://cdn1.example.com/1/2013/02/01/002-Y/seg-01001.ts
. . .
EXT-AZK-SEG:TIME="2013-02-01T19:10:00", KEY="key-102",RATING="PG"
EXTINF:10.0, http://cdn1.example.com/1/2013/02/01/002-Y/seg-01600.ts
EXT-AZK-CHAIN:NEXT="http://cdn1.example.com/1/2013/02/01/003-Z/index.m3u8"
EXT-X-ENDLIST The npvr manifest is updated with a pointer to the next sequential npvr manifest and an ENDLIST tag. In the example above, key rotation occurred at some point, thus the encryption key ID for the final segment differs from the encryption key ID of the first segment.

In one embodiment, the directory structure program is hierarchical based on the program boundaries and the date and time the program was processed, as well as the source stream ID and transcoded bitrate, e.g.:
<media_id>/<year>/<month>/<day>/<zp_seq>-<pid>/<bitrate>/<limit>,
where <media_id> identifies the source stream, <year>, <month>, and <day> represent the date the initial program segment was processed, <zp_seq>-<pid> represents the program identifier with a zero padded sequence number for lexicographical sorting, <bitrate> represents the transcoded bitrate (though more generically describes the encoding, e.g., different bitrate/resolution audio/video, different language audio and subtitles, and/or different encryption algorithms), and <limit> represents an additional level by which directory size limits may be moderated for long running programs. In one embodiment, the <pid> corresponds to a unique identifier used to correlate program metadata. In one embodiment, the program identifier may contain additional relational metadata associating the program to one or more of: a particular content provider, a specific program series, an individual program episode, a unique instance of a program airing at a given time, etc. It should be understood that the program identifier in this context is a generic identifier for the npvr-program being processed and does not necessarily correlate to a given semantic meaning for the generic term program or the term program used within the context of a given metadata definition as should be known to those skilled in the art. In one embodiment, when program boundaries are determined based on fixed program durations, the <pid> may denote the wall clock time when the program started.

In one embodiment, the npvr manifest is an HTTP Live Streaming variant manifest. Completion of the manifest involves adding an ENDLIST tag to the end of the npvr manifest and adding a comment to point to the next sequential npvr manifest in the new program directory. The new npvr manifest should be initialized with a comment pointing to the previous sequential npvr manifest that was just completed. In one embodiment, a new encryption key is generated on program boundaries and a reference to the new key is included in the new npvr manifest. In another embodiment, the last encryption key is carried over from the previous npvr manifest and the initialization vector (IV) information is correspondingly generated. In one embodiment, the IV information is set in the MEDIA-SEQUENCE tag. In another embodiment, the IV information is explicitly set with the KEY tag. In one embodiment, the packager 104 inserts wall-clock timestamp, encryption key, and rating information in comments associated with each segment in the npvr manifest. In yet another embodiment, there may be a key change in the middle of a program and the new key carried over to the next program.

In one embodiment, the packager 104 detects advertisements in the live content stream. In one embodiment, the packager 104 detects advertisements based on in-band messages (e.g., SCTE-35 cue tones). In another embodiment, the packager 104 is notified a priori out-of-band of the advertisement air time using a wall-clock start time and duration or end time for the advertisement. There are multiple ways to define advertisement boundaries as should be known to those skilled in the art. It should be understood that any method of advertisement boundary detection may be applied to the current invention. In one embodiment, the advertisement start and stop are included as comments and/or discontinuity indicators in the npvr manifest. In one embodiment, upcoming advertisement start and stop indicators are included as comments in the npvr manifest. Extending the M3U8 example above, the following manifest shows an example where program outpoint (POP) discontinuity (advertisement start) and program inpoint (PIP) discontinuity (advertisement end) notifications are inserted into the npvr manifest before segment 1006 (the first segment of the advertisement) and after segment 1008 (the last segment of the advertisement) noting the possible discontinuity in the stream due to advertisement insertion. The EXT-AZK-SEG comments for segments 1005 and 1008 also note the upcoming PIP and POP, respectively:

EXTM3U
EXT-X-TARGETDURATION:10
EXT-X-VERSION:4
EXT-X-MEDIA-SEQUENCE:1000
EXT-X-KEY:METHOD=AES-128, URI=http://localhost/key-100
EXT-X-DISCONTINUITY:TYPE="PGM",PID="Y"
EXT-AZ K-CHAIN:PREV="http://cdn1.example.com/1/2013/02/01/001-X/index.m3u8"
EXT-AZK-SEG:TIME="2013-02-01T19:00:00", KEY="key-100",RATING="PG"
EXTINF:10.0, http://cdn1.example.com/1/2013/02/01/002-Y/seg-01000.ts
EXT-AZK-SEG:TIME="2013-02-01T19:00:10", KEY="key-100",RATING="PG"
EXTINF:10.0, http://cdn1.example.com/1/2013/02/01/002-Y/seg-01001.ts
. . .
EXT-AZK-SEG:TIME="2013-02-01T19:00:50", KEY="key-101",RATING="PG", POP
EXTINF:10.0, http://cdn1.example.com/1/2013/02/01/002-Y/seg-01005.ts
EXT-X-DISCONTINUITY:TYPE="POP"

```
##EXT-AZK-SEG:TIME="2013-02-01T19:01:00",
    KEY="key-101",RATING="PG"
#EXTINF:10.0, http://cdn1.example.com/1/2013/02/01/
    002-Y/seg-01006.ts
##EXT-AZK-SEG:TIME="2013-02-01T19:01:10",
    KEY="key-101",RATING="PG"
#EXTINF:10.0, http://cdn1.example.com/1/2013/02/01/
    002-Y/seg-01007.ts
##EXT-AZK-SEG:TIME="2013-02-01T19:01:20",
    KEY="key-101",RATING="PG", PIP
#EXTINF:10.0, http://cdn1.example.com/1/2013/02/01/
    002-Y/seg-01008.ts
#EXT-X-DISCONTINUITY:TYPE="PIP"
. . .
##EXT-AZK-SEG:TIME="2013-02-01T19:10:00",
    KEY="key-102",RATING="PG"
#EXTINF:10.0, http://cdn1.example.com/1/2013/02/01/
    002-Y/seg-01600.ts
##EXT-AZK-CHAIN:NEXT="http://cdn1.example.com/
    1/2013/02/01/003-Z/index.m3u8"
#EXT-X-ENDLIST
```

When the client 110 wishes to playback the real-time streaming content, it issues a request for the master manifest to the proxy 106. The proxy 106, using information gathered from the WFM 102, generates a master manifest for the client 110. In one embodiment, the proxy 106 accesses the master manifest generated by the packager 104, which is placed by the packager 104 in the CDNs 108. The master manifest contains a list of URLs pointing to the different npvr manifests associated with the available variant stream encodings (e.g., different bitrate/resolution audio/video and/or different language audio and subtitles). In one embodiment, the information gathered from the WFM 102 includes entitlement information which limits the encodings included in the master manifest (e.g., limiting bitrate/resolution based on a maximum allowable bitrate/resolution for the content, or for the particular client 110, such as described in International Patent Application Publication WO 2011/139305). The master manifest is returned to the client 110 which then picks an encoding for playback and issues a request to the proxy 106 for the variant stream manifest. The proxy 106 retrieves the current npvr manifest from one of the CDNs 108, using for example techniques shown in US Patent Application Publication US 2012/0240176. The proxy 106 then generates a variant manifest based on the information in the retrieved npvr manifest.

Depending on the current mode of playback, parsing of the npvr manifest and generation of the variant manifest differs as described below. The variant manifest is then returned to the client 110.

1. Live Playback

If more than the necessary number of N segments (e.g., 3) are available in the most recent npvr manifest, the proxy 106 will trim the beginning segments leaving only N segments (adjusting the encryption key information accordingly, e.g., by selecting the last key specified before the current segment and applying the proper IV as required, as should be familiar to those skilled in the art) and return a sliding window manifest to the client 110. Using the M3U8 manifest from the previous example, assuming only the first 300 segments of program Y have been processed by the packager 104, the proxy 106 would generate the following manifest using the last three segments:

```
#EXTM3U
EXT-X-TARGETDURATION:10
EXT-X-VERSION:4
#EXT-X-MEDIA-SEQUENCE:1297
#EXT-X-KEY:METHOD=AES-128, URI=http://local-
    host/key-100
##EXT-AZK-SEG:TIME="2013-02-01T19:04:30",
    KEY="key-100",RATING="PG"
#EXTINF:10.0, http://cdn1.example.com/1/2013/02/01/
    002-Y/seg-01297.ts
##EXT-AZK-SEG:TIME="2013-02-01T19:04:40",
    KEY="key-100",RATING="PG"
#EXTINF:10.0, http://cdn1.example.com/1/2013/02/01/
    002-Y/seg-01298.ts
##EXT-AZK-SEG:TIME="2013-02-01T19:04:50",
    KEY="key-100",RATING="PG"
#EXTINF:10.0, http://cdn1.example.com/1/2013/02/01/
    002-Y/seg-01299.ts
```

If the most recent npvr manifest contains fewer than N segments, the proxy 106 will use the previous npvr manifest pointer to retrieve previous npvr manifest(s) and draw additional segments from previous npvr manifest(s) as necessary to generate the sliding window manifest (adjusting the encryption key information accordingly, e.g., by selecting the last key specified before the current segment and applying the proper IV as required, as should be familiar to those skilled in the art) and return a sliding window manifest to the client 110. Using the M3U8 manifest from the previous example, assuming only the first segment of program Y have been processed by the packager 104, the proxy 106 would generate the following manifest using the first segment from program Y and two segments from the previous program X:

```
#EXTM3U
EXT-X-TARGETDURATION:10
EXT-X-VERSION:4
#EXT-X-MEDIA-SEQUENCE:998
#EXT-X-KEY:METHOD=AES-128, URI=http://local-
    host/key-99
#EXT-X-DISCONTINUITY:TYPE="PGM",PID="X"
##EXT-AZK-SEG:TIME="2013-02-01T18:59:40",
    KEY="key-99",RATING="PG-13"
#EXTINF:10.0, http://cdn1.example.com/1/2013/02/01/
    001-X/seg-00998.ts
##EXT-AZK-SEG:TIME="2013-02-01T18:59:50",
    KEY="key-99",RATING="PG-13"
#EXTINF:10.0, http://cdn1.example.com/1/2013/02/01/
    001-X/seg-00999.ts
#EXT-X-KEY:METHOD=AES-128, URI=http://local-
    host/key-100
#EXT-X-DISCONTINUITY:TYPE="PGM",PID="Y"
##EXT-AZK-SEG:TIME="2013-02-01T19:00:00",
    KEY="key-100",RATING="PG"
#EXTINF:10.0, http://cdn1.example.com/1/2013/02/01/
    002-Y/seg-01000.ts
```

2. Time-Shifted Playback (Pause, Rewind, Fast Forward)

When the client 110 wishes to pause or rewind while viewing real-time streaming content, or subsequently fast forward after having paused or rewound while viewing real-time streaming content, it issues a corresponding request to the proxy 106. In one embodiment, the client 110 will restart the media player. When the media player restarts it will issue new requests for a master manifest and variant manifest. When the proxy 106 receives the new manifest requests after restart, it will generate new manifests based on the pause/rewind/fast forward request. In another embodiment, the client 110 will allow the media player to continue without restarting. In this case, the media player will naturally request a new variant manifest after the segment duration has elapsed, as should be known to those skilled in the art.

In one embodiment, upon receiving a pause request, the proxy 106 stores the current npvr manifest location, current segment number and corresponding wall-clock timestamp for the current segment. On the next manifest request, the proxy 106 uses the stored segment number to generate a sliding window manifest for the client 110. In another embodiment, the client 110 sends the wall-clock timestamp corresponding to the pause request in the next manifest request. In one embodiment, the wall-clock timestamp is calculated as the wall-clock time corresponding to the video position of the last playback action (i.e., start, pause, rewind, fast forward), plus the duration of playback since the last playback action (e.g., based off of a free running timer or using presentation timestamp differentials from the media player). There are many methods of tracking playback position and progress as should be known to those skilled in the art, it should be understood that any method for determining playback position (i.e., the wall-clock time corresponding to the last playback action) should be suitable for the current invention.

In one embodiment, the proxy 106 will find the next segment that follows the stored segment number (taking into account program boundaries and using the next npvr manifest pointer to resolve boundary crossings and adjusting encryption key information as necessary, e.g., by selecting the last key specified before the current segment and applying the proper IV as required, as should be familiar to those skilled in the art) and generate the sliding window manifest. In another embodiment, the proxy 106 will find the segment which has the most recent associated wall-clock timestamp which is beyond the saved wall-clock timestamp, or the wall-clock timestamp included in the manifest request. Using the M3U8 manifest from the previous examples, assuming the client 110 was viewing the stream in real-time and had last been presented with a sliding window manifest that ended in segment seg-01100 when it requested a pause, and did not resume playback for 2 minutes: the most current real-time segment (assuming no short segments were generated, e.g., due to advertisement boundary chopping) would be seg-01220, and starting a new player would generate a sliding window manifest containing segments seg-01220, seg-01219, and seg-01218, however, the post-pause manifest generated by the proxy 106 would contain segments seg-01099, seg-01100, and seg-01101, allowing the client 110 to continue where it left off. If the client 110 was not viewing the stream in real-time, but had previously paused/rewound/fast forwarded, the same principle would apply using the most recent segment that had been presented to the client 110 media player.

In one embodiment, upon receiving a rewind request, the proxy 106 uses the current segment number and corresponding wall-clock timestamp for the current segment to calculate a target wall-clock time based on the number of seconds the user wishes to rewind. In another embodiment, the client 110 sends the wall-clock timestamp corresponding to the target wall-clock time of the rewind operation in the next manifest request. In one embodiment, the target wall-clock timestamp is calculated as the wall-clock time corresponding to the video position of the last playback action (i.e., start, pause, rewind, fast forward), plus the duration of playback since the last playback action (e.g., based off of a free running timer or using presentation timestamp differentials from the media player) minus the number of seconds the user wishes to rewind. There are many methods of tracking playback position and progress as should be known to those skilled in the art, it should be understood that any method for determining the target wall-clock time should be suitable for the current invention.

Using the target wall-clock time, the proxy determines the segment number corresponding to that wall-clock time by searching the npvr manifest. In one embodiment, if the target wall-clock time does not reside in the current npvr manifest, the proxy 106 uses the previous npvr manifest pointers to find the npvr manifest which contains the target segment corresponding to the target wall-clock time by walking the npvr manifest chain pointers until an npvr manifest is found which contains the target wall-clock time. The proxy 106 then stores the target-npvr manifest location along with the target segment number and corresponding target wall-clock time. In another embodiment, the proxy 106 uses information provided by the WFM 102 to determine the npvr manifest associated with the saved wall-clock timestamp, or the wall-clock timestamp included in the manifest request. In one embodiment, the proxy 106 periodically syncs npvr manifest information from the WFM 102 (e.g., using streaming database replication). In another embodiment, the proxy 106 retrieves npvr manifest information from a shared distributed database managed and updated by the WFM 102.

In one embodiment, the proxy 106 uses the stored target segment number to generate a sliding window manifest for the client 110 (taking into account program boundaries and using the next npvr manifest pointer to resolve boundary crossings and adjusting encryption key information as necessary, e.g., by selecting the last key specified before the current segment and applying the proper IV as required, as should be familiar to those skilled in the art). In another embodiment, the proxy 106 will find the segment which has the most recent associated wall-clock timestamp which is beyond the saved target wall-clock timestamp, or the target wall-clock timestamp included in the manifest request. Using the M3U8 manifest from the previous examples, assuming the client 110 was viewing the stream in real-time and had last been presented with a sliding window manifest that ended in segment seg-01100 when it requested a rewind of 30 seconds. Normally (assuming no short segments were generated, e.g., due to advertisement boundary chopping), a subsequent manifest request would generate a sliding window manifest containing segments seg-01101, seg-01100, and seg-01099, however, the post-rewind manifest generated by the proxy 106 would contain segments seg-01097, seg-01096, and seg-01095, allowing the client 110 to (re) view the previously rendered content. If the client 110 was not viewing the stream in real-time, but had previously paused/rewound/fast forwarded, the same principle would apply using the most recent segment that had been presented to the client 110 media player.

The fast forward operation is similar to rewind. In one embodiment, upon receiving a fast forward request, the proxy 106 uses the current segment number and corresponding wall-clock timestamp for the current segment to calculate a target wall-clock based on the number of seconds the user wishes to fast forward. In another embodiment, the client 110 sends the wall-clock timestamp corresponding to the target wall-clock time of the fast forward operation in the next manifest request. In one embodiment, the target wall-clock timestamp is calculated as the wall-clock time corresponding to the video position of the last playback action (i.e., start, pause, rewind, fast forward), plus the duration of playback since the last playback action (e.g., based off of a free running timer or using presentation timestamp differentials from the media player) plus the number of seconds the user wishes to fast forward. There are many methods of tracking playback position and progress as should be known to those skilled in the art, it should be understood that any method for determining the target wall-clock time should be suitable for the current invention.

Using the target wall-clock time, the proxy determines the segment number corresponding to that wall-clock time by searching the npvr manifest. In one embodiment, if the target wall-clock time does not reside in the current npvr manifest, the proxy 106 uses the next npvr manifest pointers to find the npvr manifest which contains the target segment corresponding to the target wall-clock time by walking the npvr manifest chain pointers until an npvr manifest is found which contains the target wall-clock time. The proxy 106 then stores the target-npvr manifest location along with the target segment number and corresponding target wall-clock time. In another embodiment, the proxy 106 uses information provided by the WFM 102 to determine the npvr manifest associated with the saved wall-clock timestamp, or the wall-clock timestamp included in the manifest request. In one embodiment, the proxy 106 periodically syncs npvr manifest information from the WFM 102 (e.g., using streaming database replication). In another embodiment, the proxy 106 retrieves npvr manifest information from a shared distributed database managed and updated by the WFM 102.

In one embodiment, the proxy 106 uses the stored target segment number to generate a sliding window manifest for the client 110 (taking into account program boundaries and using the next npvr manifest pointer to resolve boundary crossings and adjusting encryption key information as necessary, e.g., by selecting the last key specified before the current segment and applying the proper IV as required, as should be familiar to those skilled in the art). In another embodiment, the proxy 106 will find the segment which has the most recent associated wall-clock timestamp which is before the saved target wall-clock timestamp, or the target wall-clock timestamp included in the manifest request. If the target wall-clock time represents a wall-clock time in the future which is beyond the wall-clock timestamp of the most recent segment generated by the packager 104, the proxy 106 switches back to real-time viewing and generates a sliding window manifest using the most recent N segments (taking into account program boundaries and using the next npvr manifest pointer to resolve boundary crossings and adjusting encryption key information as necessary, e.g., by selecting the last key specified before the current segment and applying the proper IV as required, as should be familiar to those skilled in the art). Using the M3U8 manifest from the previous examples, assuming the client 110 was viewing the stream after already having paused or rewound, where the last sliding window manifest presented to the client 110 media player ended in segment seg-01100, and the most recent segment generated by the packager 104 is seg-01200, when the client 110 requested a fast forward of 30 seconds. Without the fast forward, a subsequent time-shifted manifest request would generate a sliding window manifest containing segments seg-01101, seg-01100, and seg-01099, however, the post-fast forward manifest generated by the proxy 106 (assuming no short segments were generated, e.g., due to advertisement boundary chopping) would contain segments seg-01104, seg-01103, and seg-01102, allowing the client 110 to skip ahead. In the case of fast forward, the client 110 must not be viewing the stream in real-time, as fast forwarding in real-time has no effect.

3. Playback of Recorded Content (VOD)

In this section, the term "program" refers to both the content for a given npvr manifest as well as a unit of playback requested by a client, which may be different. It will be clear from context which meaning is intended.

When the client 110 wishes to playback a previously recorded program which was recorded from a real-time content stream, it issues a request for the master and variant manifests to the proxy 106. In processing the variant manifest request, if the completed npvr manifest generated by the packager 104 contains all the segments and key information required for playback of the requested program, and only the segments and key information for the requested program, the proxy transparently returns the npvr manifest from the CDN 108 to the client 110.

If a single completed npvr manifest generated by the packager 104 contains more than the necessary number of segments, the proxy 106 trims segments from the beginning and end of the npvr manifest (adjusting the encryption key information accordingly, e.g., by selecting the last key specified before a given segment and applying the proper IV as required, as should be familiar to those skilled in the art) to create a manifest corresponding to the desired program and return it to client 110. Using the M3U8 manifest from the previous examples, we can trim two minutes from the beginning and end of program Y to generate the following manifest:

```
#EXTM3U
EXT-X-TARGETDURATION:10
EXT-X-VERSION:4
#EXT-X-MEDIA-SEQUENCE:1120
#EXT-X-KEY:METHOD=AES-128, URI=http://local-
   host/key-100
#EXT-X-DISCONTINUITY:TYPE="PGM",PID="Y"
##EXT-AZK-SEG:TIME="2013-02-01T19:02:00",
   KEY="key-100",RATING="PG"
#EXTINF:10.0, http://cdn1.example.com/1/2013/02/01/
   002-Y/seg-01120.ts
##EXT-AZK-SEG:TIME="2013-02-01T19:08:00",
   KEY="key-102",RATING="PG"
#EXTINF:10.0, http://cdn1.example.com/1/2013/02/01/
   002-Y/seg-01480.ts
#EXT-X-ENDLIST
```

If the program spans multiple npvr manifest files, the proxy 106 uses the next and/or previous npvr manifest pointers to locate the necessary npvr manifest files, then concatenates the segment information and trims off any excess segments from the beginning and end (adjusting the encryption key information accordingly, e.g., by selecting the last key specified before a given segment and applying the proper IV as required, as should be familiar to those skilled in the art) to generate a manifest for the desired program to return to the client 110. In one embodiment, the program boundaries are defined by wall-clock timestamps. In one embodiment, the start segment is determined to be the segment which contains the starting wall-clock timestamp, while the end segment is determined to be the segment which contains the ending wall-clock timestamp. Using the M3U8 manifest from the previous examples, we can draw an addition two minutes from both the previous program X and the next program Z to generate the following manifest which spans three npvr manifests (i.e., http:// . . . /001-X, http:// . . . /002-Y, and http:// . . . /003-Z):

```
#EXTM3U
EXT-X-TARGETDURATION:10
EXT-X-VERSION:4
#EXT-X-MEDIA-SEQUENCE:880
#EXT-X-KEY:METHOD=AES-128, URI=http://local-
   host/key-99
#EXT-X-DISCONTINUITY:TYPE="PGM",PID="X"
##EXT-AZK-SEG:TIME="2013-02-01T18:58:00",
   KEY="key-99",RATING="PG-13"
```

```
#EXTINF:10.0, http://cdn1.example.com/1/2013/02/01/
    001-X/seg-00880.ts
. . .
##EXT-AZK-SEG:TIME="2013-02-01T18:59:50",
    KEY="key-99",RATING="PG-13"
#EXTINF:10.0, http://cdn1.example.com/1/2013/02/01/
    001-X/seg-00999.ts
#EXT-X-KEY:METHOD=AES-128, URI=http://local-
    host/key-100
#EXT-X-DISCONTINUITY:TYPE="PGM", PID="Y"
##EXT-AZK-SEG:TIME="2013-02-01T19:00:00",
    KEY="key-100",RATING="PG"
#EXTINF:10.0, http://cdn1.example.com/1/2013/02/01/
    002-Y/seg-01000.ts
. . .
##EXT-AZK-SEG:TIME="2013-02-01T19:10:00",
    KEY="key-102",RATING="PG"
#EXTINF:10.0, http://cdn1.example.com/1/2013/02/01/
    002-Y/seg-01600.ts
#EXT-X-DISCONTINUITY:TYPE="PGM", PID="Z"
#EXT-X-KEY:METHOD=AES-128, URI=http://local-
    host/key-103
##EXT-AZK-SEG:TIME="2013-02-01T19:10:10",
    KEY="key-103",RATING="R"
#EXTINF:10.0, http://cdn1.example.com/1/2013/02/01/
    003-Z/seg-01601.ts
. . .
##EXT-AZK-SEG:TIME="2013-02-01T19:12:10",
    KEY="key-104",RATING="PG"
#EXTINF:10.0, http://cdn1.example.com/1/2013/02/01/
    003-Z/seg-01721.ts
#EXT-X-ENDLIST
```

In one embodiment, the base URLs for segments in the variant manifest are modified to point to the proxy 106 where segments are cached for off-line playback. In one embodiment, the generated master and variant manifests for the program are cached locally in the proxy 106 upon initial retrieval from the CDN 108 and subsequently served from the local cache. In one embodiment, the segments are pre-fetched from the CDN 108 and subsequently served from the local cache.

4. Advertisement Replacement

In one embodiment, if the npvr manifest contains advertisement indicators, the proxy 106 may replace the original advertisement from the source live content with an advertisement personalized for the individual viewing the content. In one embodiment, the packager 104 inserts comments into the npvr manifest denoting the position of advertisement boundaries, as shown for example in International Patent Application Publication WO 2010/111261. In one embodiment, upon detecting the comment in the npvr manifest of an upcoming advertisement, the proxy 106 will issue a request to an advertisement decision manager (ADM) 114 and the ADM 114 will respond with an alternate advertisement to render. In one embodiment, the ADM 114 provides segment locations for an alternate advertisement. In another embodiment, the proxy 106 requests the segment locations for the alternate advertisement from the WFM 102. When the proxy 106 generates the manifest file to present to the client 110 media player, it will replace the segment URLs from the npvr manifest, with the segment URLs for the alternate advertisement.

Extending the previous live playback example, the proxy 106 would generate a series of manifests as follows, replacing segments 1006 through 1008 with alternate advertisement segments (adjusting the encryption key information accordingly, e.g., by selecting the last key specified before a given segment and applying the proper IV as required, as should be familiar to those skilled in the art):

```
#EXTM3U
EXT-X-TARGETDURATION:10
EXT-X-VERSION:4
#EXT-X-MEDIA-SEQUENCE:1004
#EXT-X-KEY:METHOD=AES-128, URI=http://local-
    host/key-100, IV=0x3ec
##EXT-AZK-SEG:TIME="2013-02-01T19:00:40",
    KEY="key-100",RATING="PG"
#EXTINF:10.0, http://cdn1.example.com/1/2013/02/01/
    002-Y/seg-01004.ts
#EXT-X-KEY:METHOD=AES-128, URI=http://local-
    host/key-100, IV=0x3ed
##EXT-AZK-SEG:TIME="2013-02-01T19:00:50",
    KEY="key-100",RATING="PG"
#EXTINF:10.0, http://cdn1.example.com/1/2013/02/01/
    002-Y/seg-01005.ts
#EXT-X-KEY:METHOD=AES-128, URI=http://local-
    host/key-ad-1, IV=0x1
#EXT-X-DISCONTINUITY:TYPE="POP"
##EXT-AZK-SEG:TIME="2013-02-01T19:01:00",
    KEY="key-ad-1",RATING="PG"
#EXTINF:10.0, http://cdn1.example.com/alternate/ad-
    vertisement/seg-00001.ts
#EXTM3U
EXT-X-TARGETDURATION:10
EXT-X-VERSION:4
#EXT-X-MEDIA-SEQUENCE:1005
#EXT-X-KEY:METHOD=AES-128, URI=http://local-
    host/key-100
#EXT-X-KEY:METHOD=AES-128, URI=http://local-
    host/key-100, IV=0x3ed
##EXT-AZK-SEG:TIME="2013-02-01T19:00:50",
    KEY="key-100",RATING="PG"
#EXTINF:10.0, http://cdn1.example.com/1/2013/02/01/
    002-Y/seg-01005.ts
#EXT-X-KEY:METHOD=AES-128, URI=http://local-
    host/key-ad-1, IV=0x1
#EXT-X-DISCONTINUITY:TYPE="POP"
##EXT-AZK-SEG:TIME="2013-02-01T19:01:00",
    KEY="key-ad-1",RATING="PG"
#EXTINF:10.0, http://cdn1.example.com/alternate/ad-
    vertisement/seg-00001.ts
#EXT-X-KEY:METHOD=AES-128, URI=http://local-
    host/key-ad-1, IV=0x2
##EXT-AZK-SEG:TIME="2013-02-01T19:01:10",
    KEY="key-ad-1",RATING="PG"
#EXTINF:10.0, http://cdn1.example.com/alternate/ad-
    vertisement/seg-00002.ts
#EXTM3U
EXT-X-TARGETDURATION:10
EXT-X-VERSION:4
#EXT-X-MED IA-SEQUENCE:1
#EXT-X-KEY:METHOD=AES-128, URI=http://local-
    host/key-ad-1, IV=0x1
##EXT-AZK-SEG:TIME="2013-02-01T19:01:00",
    KEY="key-ad-1;",RATING="PG"
#EXTINF:10.0, http://cdn1.example.com/alternate/ad-
    vertisement/seg-00001.ts
#EXT-X-KEY:METHOD=AES-128, URI=http://local-
    host/key-ad-1, IV=0x2
##EXT-AZK-SEG:TIME="2013-02-01T19:01:10",
    KEY="key-ad-1",RATING="PG"
#EXTINF:10.0, http://cdn1.example.com/alternate/ad-
    vertisement/seg-00002.ts
```

```
#EXT-X-KEY:METHOD=AES-128,    URI=http://local-
    host/key-ad-1, IV=0x3
##EXT-AZK-SEG:TIME="2013-02-01T19:01:20",
    KEY="key-ad-1",RATING="PG"
#EXTINF:10.0,    http://cdn1.example.com/alternate/ad-
    vertisement/seg-00003.ts
#EXTM3U
EXT-X-TARGETDURATION:10
EXT-X-VERSION:4
#EXT-X-MEDIA-SEQUENCE:2
#EXT-X-KEY:METHOD=AES-128,    URI=http://local-
    host/key-ad-1, IV=0x2
##EXT-AZK-SEG:TIME="2013-02-01T19:01:10",
    KEY="key-ad-1",RATING="PG"
#EXTINF:10.0,    http://cdn1.example.com/alternate/ad-
    vertisement/seg-00002.ts
#EXT-X-KEY:METHOD=AES-128,    URI=http://local-
    host/key-ad-1,1V=0x3
##EXT-AZK-SEG:TIME="2013-02-01T19:01:20",
    KEY="key-ad-1",RATING="PG"
#EXTINF:10.0,    http://cdn1.example.com/alternate/ad-
    vertisement/seg-00003.ts
#EXT-X-KEY:METHOD=AES-128,    URI=http://local-
    host/key-100, IV=0x3f1
#EXT-X-KEY:METHOD=AES-128,    URI=http://local-
    host/key-100
#EXT-X-DISCONTINUITY:TYPE="PIP"
##EXT-AZK-SEG:TIME="2013-02-01T19:01:30",
    KEY="key-100",RATING="PG"
#EXTINF:10.0,  http://cdn1.example.com/1/2013/02/01/
    002-Y/seg-01009.ts
```

In one embodiment, the proxy 106 is provided with a plurality of ADM servers 114 by the WFM 102. In one embodiment, the preferred ADM 114 selected by the proxy 106 is based on a simple round robin scheme. In another embodiment, priorities for each ADM 114 are provided by the WFM 102 and the proxy 106 selects the preferred ADM 114 using a weighted round robin scheme. In another embodiment, the proxy 106 selects the preferred ADM 114 based on random selection. There are many algorithms for selecting a preferred server from a list of servers, as should be known to those skilled in the art. It should be understood that any method for selecting a preferred ADM 114 should be considered valid for use with the current invention.

Figure 2:
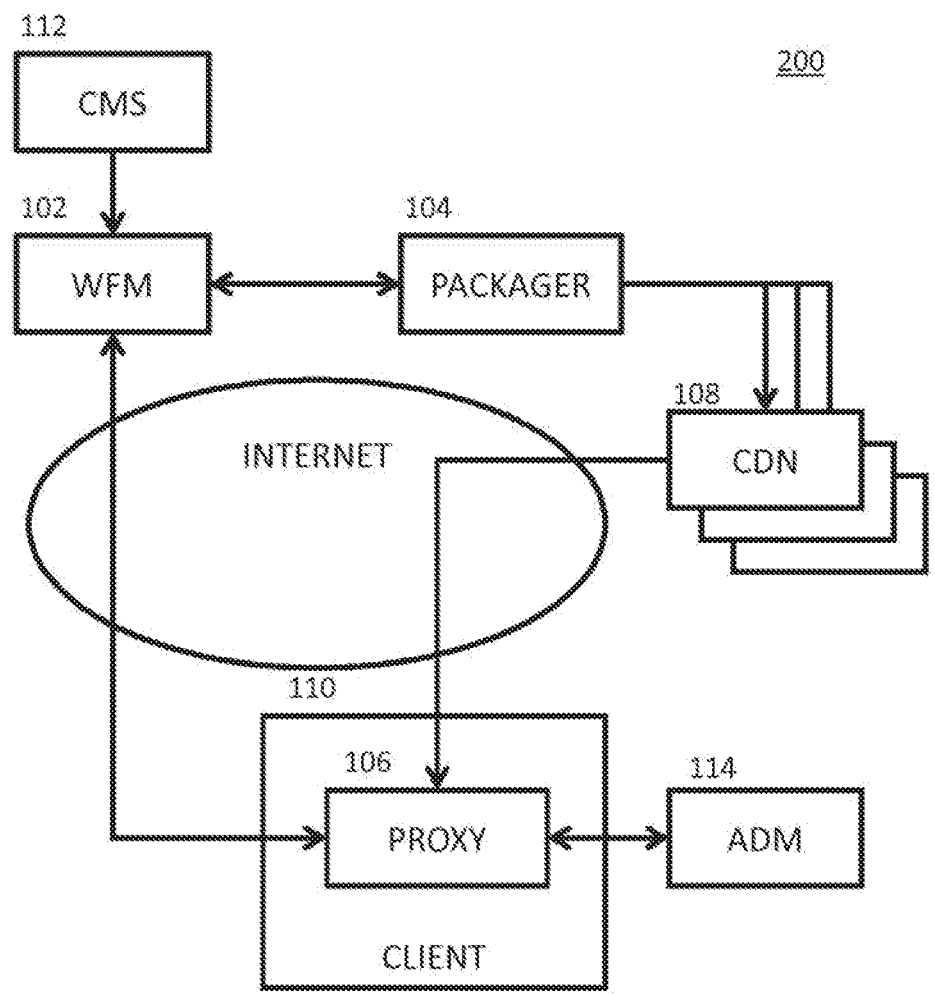
FIG. 2 is a block diagram of a system which is capable of conducting end-to-end content delivery procedures, in accordance with various embodiments.

In FIG. 2 is a block diagram for another embodiment. System 200 is identical to system 100 with the exception of proxy 106 which is embedded within client 110.

Figure 3:
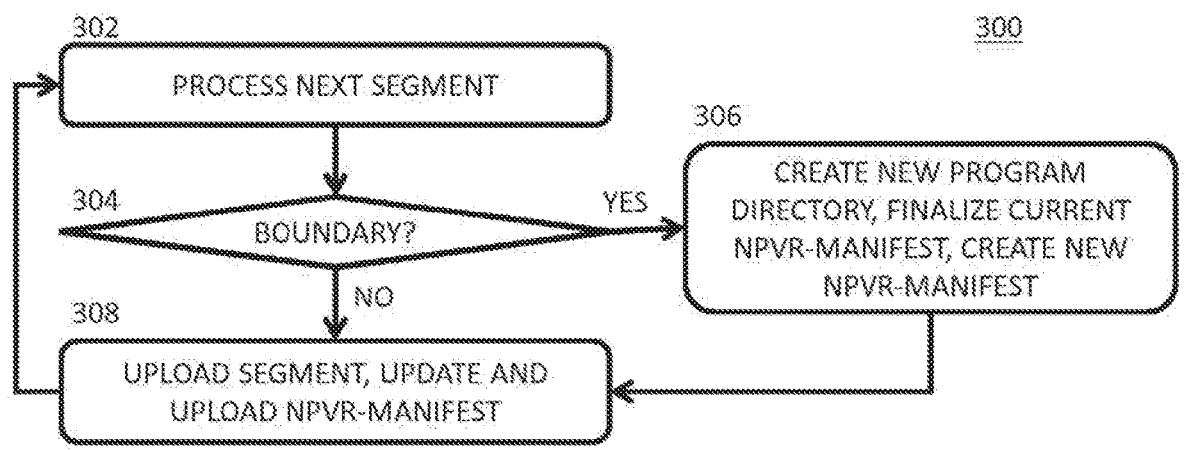
FIG. 3 is a flow chart showing a method for performing media preparation, in accordance with various embodiments.

In FIG. 3 is a flow chart for a process 300 performed at a packager 104 for processing real-time streaming content and generating npvr manifests for use in real-time, time-shifted, or VoD playback.

In step 302, the packager 104 processes a next segment, where the segment is compiled from transcoded real-time streaming input. In one embodiment, the segment is generated to be of a fixed target duration. In one embodiment, the segment may be shorter than the fixed target duration, e.g., the last segment before a program boundary or an advertisement boundary may be shortened so that the first segment after the program or advertisement boundary starts on a new segment boundary. In one embodiment, program boundary information and/or advertisement boundary information is provided in-band via SCTE-35 cue tones. In another embodiment, program boundary information and/or advertisement boundary information is provided out-of-band via SCTE-118, SCTE-130, or other proprietary signaling protocols. There are numerous ways to signal program boundary information and/or advertisement boundary information, as should be known to those skilled in the art. It should be understood that any method for detecting program boundary information and/or advertisement boundary information should be considered valid for use with the current invention.

In step 304, the packager 104 checks to see if a program boundary or an advertisement boundary has been reached. If a program boundary or an advertisement boundary has not yet been reached, processing continues to step 308 where the current npvr manifest is updated with the new segment information and uploaded to the CDN(s) 108 after the new segment is uploaded the CDN(s) 108. If a program boundary or an advertisement boundary has been reached, processing continues to step 30 6 where the packager creates new directories in the CDN(s) 108 for the next program, updates the current npvr manifest with the new segment information, completes the current npvr manifest by adding a next npvr manifest pointer and ENDLIST tag, and creates a new npvr manifest file for the new program, before proceeding to step 308, where the segment and both manifests (current and new) are uploaded to the CDN(s) 108.

Figure 4:
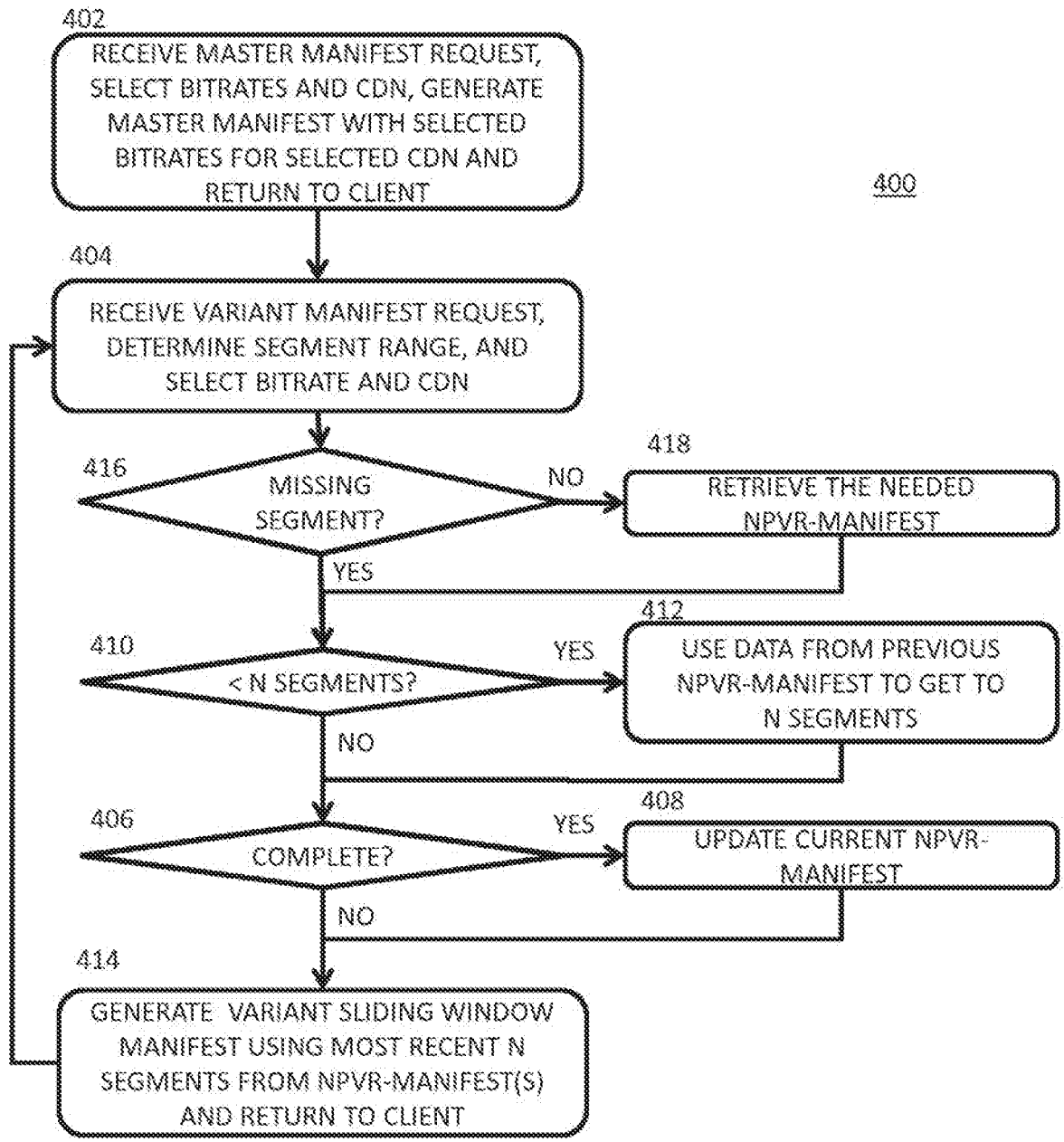
FIG. 4 is a flow chart showing a method for performing real-time content rendering, in accordance with various embodiments.

In FIG. 4 is a flow chart describing a process 400 performed at a proxy 106 for generating sliding window manifest files for the client 110 for real-time playback of real-time streaming content.

In step 402, the proxy 106 receives a request from client 110 for the master manifest. The master manifest contains a list of variant manifest URLs corresponding to different available encodings (e.g., different bitrate/resolution audio/video and/or different language audio and subtitles). In one embodiment, the variant manifest URLs point to back to the proxy 106. In one embodiment, the variant manifest URLs contain the wall clock timestamp of the master manifest request. In one embodiment, the proxy 106 determines the available bitrates based on information provided by the WFM 102. In another embodiment, the proxy 106 determines the available bitrates based on the master manifest produced by the packager 104 and placed in the CDNs 108. In one embodiment, the proxy 106 determines a subset of bitrates to present to the client 110. In one embodiment, the set of bitrates is determined based on user restrictions configured for client 110 by the WFM 102. In another embodiment, the set of bitrates is determined based on network restrictions provided by the WFM 102. In another embodiment, the set of bitrates is determined based on the current network load estimated by the proxy 106 based on the aggregate number of manifest requests and their corresponding bitrates seen within a given time window (e.g., the last 30 seconds). Techniques for these operations are described in International Patent Application Publication WO 2011/139305). The proxy 106 returns the master manifest to the client 110 and proceeds to step 404.

In step 404, the proxy 106 receives a variant manifest request from the client 110, for a specific bitrate. In one embodiment, the proxy 106 chooses a CDN 108 from which the client 110 should retrieve segments. In one embodiment, the CDN 108 is selected based on a strict prioritization provided by the WFM 102. In another embodiment, the CDN 108 is selected based on a round-robin or weighted round-robin scheme where the weights are provided by the WFM 102. In another embodiment, the CDN 108 is selected based on aggregate latency measurements for manifest and/or segment retrievals performed by the proxy 106 within a given time window (e.g., the last 30 seconds). In another embodiment, the CDN 108 is selected based on aggregate bandwidth measurements for manifest and/or segment retrievals performed by the proxy 106 within a given time window (e.g., the last 30 seconds). Techniques for CDN selection are described in US Patent Application Publication US 2012/0240176. In one embodiment, the proxy 106 chooses a bitrate to serve to the client 110, where the bitrate may be lower than the bitrate requested by the client 110. In one embodiment, the bitrates is determined based on user restrictions configured for client 110 by the WFM 102. In another embodiment, the bitrate is determined based on network restrictions provided by the WFM 102. Techniques for bitrate selection are described in International Patent Application Publication WO 2011/139305. In another embodiment, the bitrate is determined based on the current network load estimated by the proxy 106 based on the aggregate number of manifest requests and their corresponding bitrates seen within a given time window (e.g., the last 30 seconds). In another embodiment, the bitrate is selected based on aggregate latency measurements for manifest and/or segment retrievals from the CDN 108 performed by the proxy 106 within a given time window (e.g., the last 30 seconds). In another embodiment, the bitrate is selected based on aggregate bandwidth measurements for manifest and/or segment retrievals from the CDN 108 performed by the proxy 106 within a given time window (e.g., the last 30 seconds).

In step 404, the proxy 106 also determines the segment range required to fulfill the request. In one embodiment, the proxy 106 stores the segment range from the previous manifest request, or from the previous playback action (i.e., pause, play, rewind, fast forward). In another embodiment, the client 110 provides a target wall-clock time for the previous playback action (i.e., pause, play, rewind, fast forward). In one embodiment, the client 110 restarts the media player on each playback action which results in new master manifest requests, which results in new variant manifest URLs generated with the current wall-clock time for that playback action. In another embodiment, the wall-clock timestamp is calculated by the client 110 as the wall-clock time corresponding to the video position of the last playback action (i.e., start, pause, rewind, fast forward), plus the duration of playback since the last playback action (e.g., based off of a free running timer or using presentation timestamp differentials from the media player) plus or minus the number of seconds the user wishes to either fast forward or rewind, respectively. There are many methods of tracking playback position and progress as should be known to those skilled in the art, it should be understood that any method for determining the target wall-clock time should be suitable for the current invention.

Once the segment range is determined and the bitrate and CDN have been selected, processing continues to step 416 where the proxy 106 checks to see if the already cached npvr manifest files contain the necessary segment information to fulfill the request. If the already cached npvr manifest files do not contain the necessary segment information, processing continues to step 418 where the proxy 106 retrieves the needed npvr manifest file. If the client 110 is currently playing the real-time streaming content, the proxy 106 retrieves the most recent npvr manifest from the selected CDN 108 for the selected bitrate. In one embodiment, the proxy 106 retrieves only the portion of the most recent npvr manifest that it does not already have cached. In one embodiment, the proxy 106 uses an HTTP range request to retrieve only those bytes starting from one greater than the last byte previously retrieved until the current end of file. Otherwise, if the client 110 is not currently playing the real-time streaming content, the location of the needed npvr manifest must be determined. In one embodiment, the proxy 106 uses the next npvr manifest pointers to find the npvr manifest which contains the target segment corresponding to the target wall-clock time by walking the npvr manifest chain pointers until an npvr manifest is found which contains the target wall-clock time. This may require retrieving multiple npvr manifest files from the selected CDN 108. In another embodiment, the proxy 106 uses information provided by the WFM 102 to determine the npvr manifest associated with the target wall-clock time. In one embodiment, the proxy 106 periodically syncs npvr manifest information from the WFM 102 (e.g., using streaming database replication). In another embodiment, the proxy 106 retrieves npvr manifest information from a shared distributed database managed and updated by the WFM 102. Once the need npvr manifest location is determined, the proxy 106 retrieves the needed npvr manifest from the selected CDN 108 for the selected bitrate.

If the necessary segments were found locally cached in step 416 processing continues directly to step 410. Otherwise, after retrieving the needed npvr manifest, processing continues to step 410 where the proxy 106 checks to see if sufficient segments exist in the current npvr manifest to generate the sliding window manifest. If insufficient segments exist, processing continues to step 412, where the proxy 106 uses the previous npvr manifest to get the requisite number of segments (e.g., three) to generate the sliding window manifest. If the previous npvr manifest is not locally cached, the proxy 106 retrieves the previous npvr manifest using the previous npvr manifest pointer URL. In one embodiment, the proxy 106 always caches the two most recent npvr manifest files so that it can easily handle boundary crossing conditions. In one embodiment, the proxy 106 caches all previously downloaded completed npvr manifest files.

If the necessary segments were found in the current manifest in step 410 processing continues directly to step 406. Otherwise, after consulting the previous npvr manifest, processing continues to step 406 where the proxy 106 checks to see if current npvr manifest is now complete. If the current npvr manifest is complete, processing continues to step 408. In one embodiment, the proxy 106 maintains session state and updates the current manifest to be the next npvr manifest indicated by the next npvr manifest pointer, before continuing to step 414. If the npvr manifest was not complete in step 406, processing continues directly to step 414.

In step 414, the proxy 106 generates a sliding window manifest containing the selected N segments and returns it to the client 110. In one embodiment, if the current sliding window manifest contains advertisement segments, when generating the sliding window manifest in step 414, the proxy 106 replaces the segments specified in the npvr manifest with alternate advertisement segments. In one embodiment, the proxy 106 detects an upcoming advertisement based on comments in the npvr manifest. In one embodiment, the proxy 106 issues a request to the ADM 114 to determine which alternate advertisement to present to the client 110. In one embodiment, the alternate advertisement segment locations are specified by the ADM 114. In another embodiment, the proxy 106 retrieves the alternate advertisement segment locations, for the alternate advertisement specified by the ADM 114, from the WFM 102.

Figure 5A:
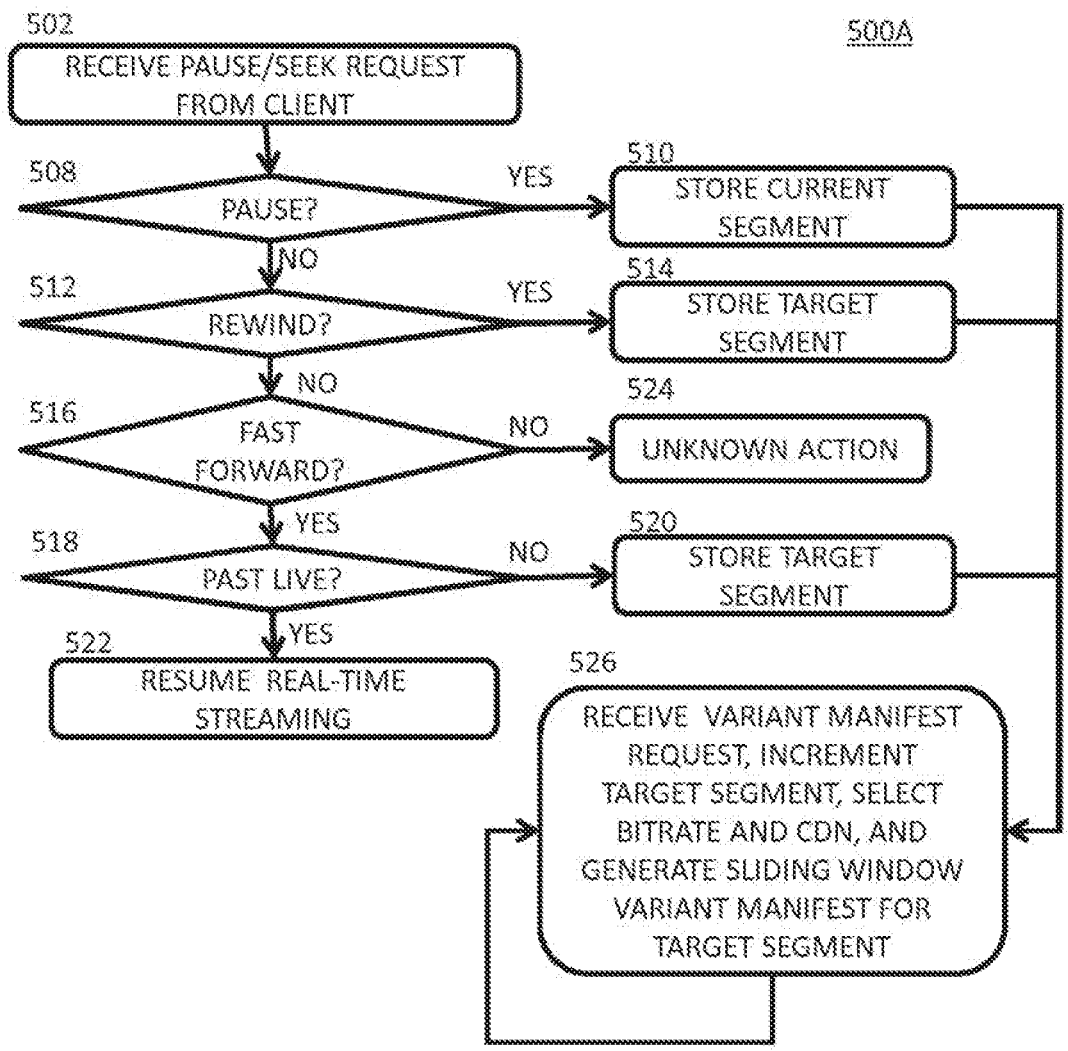
FIGS. 5A and 5B are flow charts showing methods for performing time-shifted content rendering, in accordance with various embodiments.
Figure 5B:
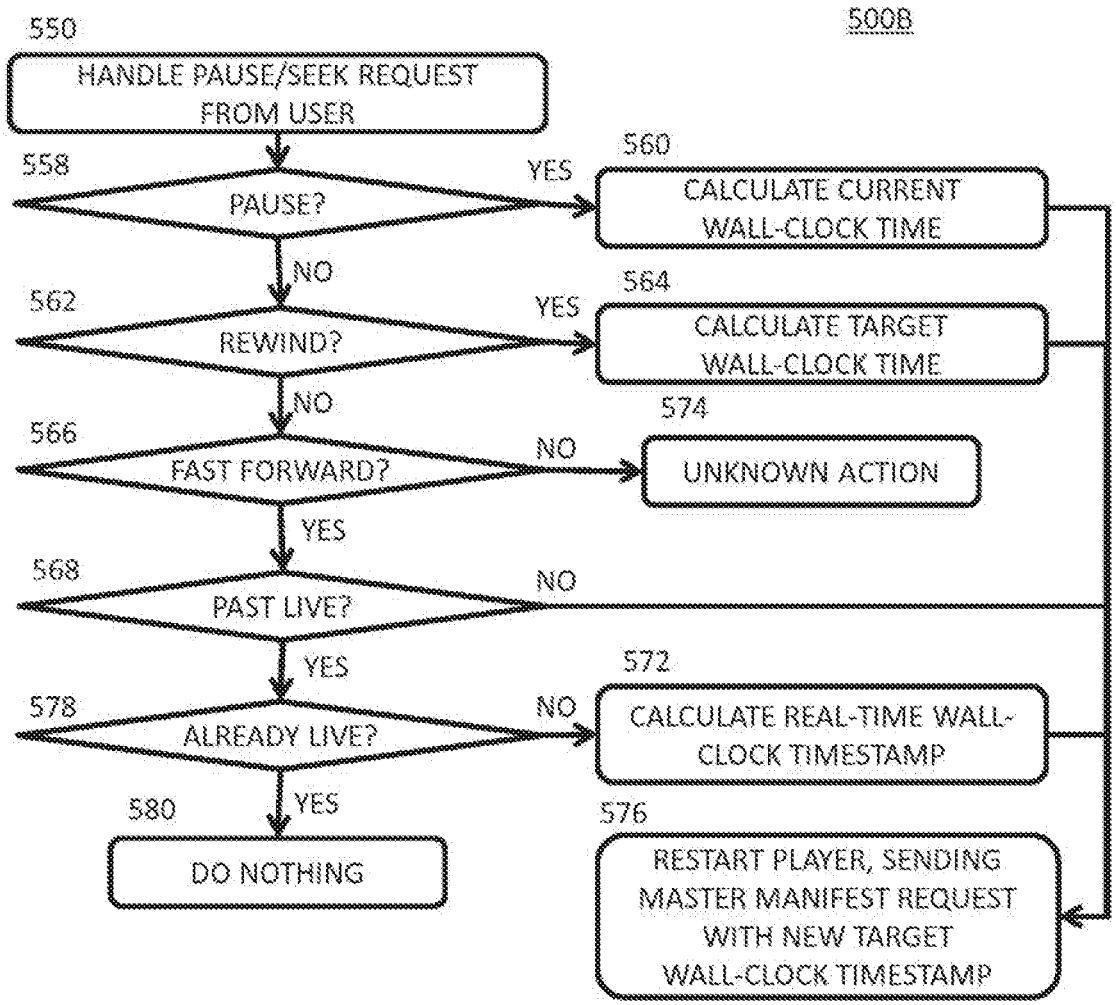

In FIGS. 5A and 5B are flow charts describing processes 500A and 500B performed at a proxy 106 for handling playback action requests (i.e., pause, play, rewind, and fast forward) from the client 110 to enable time-shifted payback of real-time streaming content. As noted previously, each of these playback actions is followed by a new manifest request generated by the client 110 media player, substantially immediately for rewind and fast forward and upon resumption of playback in the case of a pause. In one embodiment shown in FIG. 5A, the playback action request is a direct API call into the proxy 106. In another embodiment shown in FIG. 5B, the playback action is handled in the client 110, and the client 110 generates a target wall-clock timestamp corresponding to the target playback position of the playback action (i.e., play after pause, rewind, or fast forward). In one embodiment, the play after pause target wall-clock timestamp is calculated as the wall-clock time corresponding to the video position of the last playback action (i.e., start, pause, rewind, fast forward), plus the duration of playback since the last playback action (e.g., based off of a free running timer or using presentation timestamp differentials from the media player). In one embodiment, rewind target wall-clock timestamp is calculated as the wall-clock time corresponding to the video position of the last playback action (i.e., start, pause, rewind, fast forward), plus the duration of playback since the last playback action (e.g., based off of a free running timer or using presentation timestamp differentials from the media player) minus the number of seconds the user wishes to rewind. In one embodiment, fast forward target wall-clock timestamp is calculated as the wall-clock time corresponding to the video position of the last playback action (i.e., start, pause, rewind, fast forward), plus the duration of playback since the last playback action (e.g., based off of a free running timer or using presentation timestamp differentials from the media player) plus the number of seconds the user wishes to fast forward. There are many methods of tracking playback position and progress as should be known to those skilled in the art, it should be understood that any method for determining playback position (i.e., the wall-clock time corresponding to the last playback action) should be suitable for the current invention, for use in calculating target wall-clock timestamps.

Process 500A begins with step 502 where the proxy 106 receives a time-shift request (i.e., pause, fast forward, or rewind) from the client 110. Processing then continues to step 508 where the proxy 106 checks to see if the time-shift request was a pause request. If the request was a pause request, processing continues to step 510 where the proxy 106 notes the most recent segment served to the client 110 (and the segment's associated wall-clock timestamp) and then proceeds to step 526. In one embodiment, the proxy 106 maintains session state regarding whether or not the client 110 is currently viewing the real-time streaming content (denoted by a live streaming flag set to true) or whether the client 110 is timeshifted (denoted by a live streaming flag set to false). When a pause operation occurs, the live streaming flag is set to false.

If the request was not a pause request, processing continues to step 512 where the proxy 106 checks to see if the time-shift request was a rewind request. If the request was a rewind request, processing continues to step 514 where the proxy 106 notes the wall-clock timestamp of the most recent segment served to the client 110, calculates a rewind target wall-clock time for the next segment to serve to the client 110 by subtracting the rewind distance from the most recent segment's associated wall-clock timestamp, searches backward in the current npvr manifest for the segment which corresponds to the rewind target timestamp (downloading additional npvr manifest files as necessary to search additional npvr manifests for rewind requests which span program boundaries), and notes the rewind target segment along with the rewind target timestamp, then proceeds to step 526. In one embodiment, if the rewind target wall-clock time does not reside in the current npvr manifest, the proxy 106 uses the previous npvr manifest pointers to find the npvr manifest which contains the target segment corresponding to the rewind target wall-clock time by walking the npvr manifest chain pointers until an npvr manifest is found which contains the rewind target wall-clock time. In another embodiment, the proxy 106 uses information provided by the WFM 102 to determine the npvr manifest associated with the rewind target wall-clock timestamp. In one embodiment, the proxy 106 periodically syncs npvr manifest information from the WFM 102 (e.g., using streaming database replication). In another embodiment, the proxy 106 retrieves npvr manifest information from a shared distributed database managed and updated by the WFM 102. In one embodiment, the proxy 106 maintains session state regarding whether or not the client 110 is currently viewing the real-time streaming content (denoted by a live streaming flag set to true) or whether the client 110 is timeshifted (denoted by a live streaming flag set to false). When a rewind operation occurs, the live streaming flag is set to false.

If the request was not a rewind request, processing continues to step 516 where the proxy 106 checks to see if the time-shift request is a fast forward request. If the request was not a fast forward request, processing continues to step 524 where an "unknown action" error is generated. In the illustrated embodiment an error can be inferred because only pause, fast forward, and rewind are supported. Other error-detection logic may be employed in alternative embodiments, especially those having additional valid, non-error request types. If at 516 the request is a fast forward request, processing continues to step 518 where the proxy 106 notes the wall-clock timestamp of the most recent segment served to the client 110, calculates a fast forward wall-clock target time for the next segment to serve to the client 110 by adding the fast forward distance to the most recent segment's associated wall-clock timestamp, and checks to see if the fast forward target wall-clock time is in the future, i.e., beyond the timestamp of the most recent real-time segment generated by the packager 104. If the fast forward target time is in the future, i.e., beyond the timestamp of the most recent real-time segment generated by the packager 104, processing continues to step 522 where the proxy 106 generates a real-time streaming variant manifest using the most recent N segments from the most recent npvr manifest generated by the packager 104. In one embodiment, the proxy 106 maintains session state regarding whether or not the client 110 is currently viewing the real-time streaming content (denoted by a live streaming flag set to true). If the live streaming flag is already set in step 522, there is nothing that needs to be done. If the live streaming flag is not already set in step 522, the live streaming flag is set so that subsequent fast forward requests may be ignored.

If at 518 the fast forward target time is still within the range of already processed segments, processing continues to step 520 where the proxy 106 searches forward in the current npvr manifest for the segment which corresponds to the fast forward target timestamp (downloading additional npvr manifest files as necessary to search additional npvr manifests for fast forward requests which span program boundaries), and then proceeds to step 526. In one embodiment, if the fast forward target wall-clock time does not reside in the current npvr manifest, the proxy 106 uses the next npvr manifest pointers to find the npvr manifest which contains the target segment corresponding to the fast forward target wall-clock time by walking the npvr manifest chain pointers until an npvr manifest is found which contains the fast forward target wall-clock time. In another embodiment, the proxy 106 uses information provided by the WFM 102 to determine the npvr manifest associated with the fast forward target wall-clock timestamp. In one embodiment, the proxy 106 periodically syncs npvr manifest information from the WFM 102 (e.g., using streaming database replication). In another embodiment, the proxy 106 retrieves npvr manifest information from a shared distributed database managed and updated by the WFM 102. In one embodiment, the proxy 106 maintains session state regarding whether or not the client 110 is currently viewing the real-time streaming content (denoted by a live streaming flag set to true) or whether the client 110 is timeshifted (denoted by a live streaming flag set to false). When a fast forward operation occurs that does not result in resuming the real-time stream, the live streaming flag should already be set to false, but may be reset to false for good measure.

In step 526, the proxy 106 receives a variant manifest request from the client 110, for a specific bitrate. In one embodiment, the proxy 106 chooses a CDN 108 from which the client 110 should retrieve segments. In one embodiment, the CDN 108 is selected based on a strict prioritization provided by the WFM 102. In another embodiment, the CDN 108 is selected based on a round-robin or weighted round-robin scheme where the weights are provided by the WFM 102. In another embodiment, the CDN 108 is selected based on aggregate latency measurements for manifest and/or segment retrievals performed by the proxy 106 within a given time window (e.g., the last 30 seconds). In another embodiment, the CDN 108 is selected based on aggregate bandwidth measurements for manifest and/or segment retrievals performed by the proxy 106 within a given time window (e.g., the last 30 seconds). In one embodiment, the proxy 106 chooses a bitrate to serve to the client 110, where the bitrate may be lower than the bitrate requested by the client 110. In one embodiment, the bitrates is determined based on user restrictions configured for client 110 by the WFM 102. In another embodiment, the bitrate is determined based on network restrictions provided by the WFM 102. In another embodiment, the bitrate is determined based on the current network load estimated by the proxy 106 based on the aggregate number of manifest requests and their corresponding bitrates seen within a given time window (e.g., the last 30 seconds). In another embodiment, the bitrate is selected based on aggregate latency measurements for manifest and/or segment retrievals from the CDN 108 performed by the proxy 106 within a given time window (e.g., the last 30 seconds). In another embodiment, the bitrate is selected based on aggregate bandwidth measurements for manifest and/or segment retrievals from the CDN 108 performed by the proxy 106 within a given time window (e.g., the last 30 seconds).

The proxy 106 generates a sliding window manifest for the selected bitrate and CDN 108 working backward from the target segment determined in either step 510, 514, or 520. The proxy 106 returns the sliding window manifest to the client 110 and waits for a new request. For subsequent variant manifest requests, processing proceeds back to step 526 where the proxy 106 increments the target segment (following next npvr manifest pointers for increments which span program boundaries) and generates an updated sliding window variant manifest to return to the client 110. In one embodiment, if the sliding window manifest corresponding to the target time contains advertisement segments, when generating the sliding window manifest in step 526, the proxy 106 replaces the segments specified in the npvr manifest with alternate advertisement segments. In one embodiment, the proxy 106 detects an upcoming advertisement based on comments in the npvr manifest. In one embodiment, the proxy 106 issues a request to the ADM 114 to determine which alternate advertisement to present to the client 110. In one embodiment, the proxy 106 optimizes requests to the ADM 114 if the target segment is an advertisement segment, by retrieving the npvr manifest for the target segment, determining if advertisement segments are required, and issuing the request to the ADM 114 in step 510, 514, or 520, prior to receiving the variant manifest request in step 526. In one embodiment, the alternate advertisement segment locations are specified by the ADM 114. In another embodiment, the proxy 106 retrieves the alternate advertisement segment locations, for the alternate advertisement specified by the ADM 114, from the WFM 102.

It should be noted that the playback action API call which triggers the process in step 502 may be independent and asynchronous from the process of handling variant manifest requests in step 526. Though it is drawn as a single process in FIG. 5A, the steps 502-524 represent the process for changing the state (i.e., the target segment) used by the manifest generation task described in step 526. In one embodiment, the process in steps 502-524 forces a restart or reinitialization of the manifest generation task in step 526, which effectively makes step 526 a dependent step in process 500A. In another embodiment, the process in steps 502-524 simply update the current segment and current npvr manifest variables of an independent manifest generation task (e.g., a separate operating system thread or operating system process) in step 526.

Turning now to FIG. 5B, process 500B begins with step 550, where the client 110 receives a time-shift request (i.e., pause, fast forward, or rewind) from the user. Processing then continues to step 558 where the client 110 checks to see if the time-shift request was a pause request. If the request was a pause request, processing continues to step 560 where the proxy 106 notes the current playback wall-clock timestamp and then proceeds to step 576. In one embodiment, the current playback wall-clock timestamp is calculated as the wall-clock time corresponding to the video position of the last playback action (i.e., start, pause, rewind, fast forward), plus the duration of playback since the last playback action (e.g., based off of a free running timer or using presentation timestamp differentials from the media player). There are many methods of tracking playback position and progress as should be known to those skilled in the art, it should be understood that any method for determining playback position (i.e., the wall-clock time corresponding to the last playback action) should be suitable for the current invention, for use in calculating current playback wall-clock timestamp. In one embodiment, the client 110 maintains session state regarding whether or not the user is currently viewing the real-time streaming content (denoted by a live streaming flag set to true) or whether the user is timeshifted (denoted by a live streaming flag set to false). When a pause operation occurs, the live streaming flag is set to false.

If at 558 the request was not a pause request, processing continues to step 562 where the client 110 checks to see if the time-shift request was a rewind request. If the request was a rewind request, processing continues to step 564 where the client 110 calculates a rewind target wall-clock time by subtracting the rewind distance from the current playback wall-clock timestamp, then proceeds to step 576. In one embodiment, the current playback wall-clock timestamp is calculated as the wall-clock time corresponding to the video position of the last playback action (i.e., start, pause, rewind, fast forward), plus the duration of playback since the last playback action (e.g., based off of a free running timer or using presentation timestamp differentials from the media player). There are many methods of tracking playback position and progress as should be known to those skilled in the art, it should be understood that any method for determining playback position (i.e., the wall-clock time corresponding to the last playback action) should be suitable for the current invention, for use in calculating current playback wall-clock timestamp. In one embodiment, the client 110 maintains session state regarding whether or not the user is currently viewing the real-time streaming content (denoted by a live streaming flag set to true) or whether the client 110 is timeshifted (denoted by a live streaming flag set to false). When a rewind operation occurs, the live streaming flag is set to false.

If at 562 the request was not a rewind request, processing continues to step 566 where the proxy 106 checks to see if the time-shift request was a fast forward request. If the request was not a fast forward request, processing continues to step 574 where an "unknown action" error is generated, as only pause, fast forward, and rewind are supported in the illustrated embodiment. As for process 500A, other error logic may be employed in embodiments supporting additional valid, non-error request types. If at 566 the request was a fast forward request, processing continues to step 568 where the client 110 calculates a fast forward wall-clock target time by adding the fast forward distance to the current playback wall-clock timestamp. In one embodiment, the current playback wall-clock timestamp is calculated as the wall-clock time corresponding to the video position of the last playback action (i.e., start, pause, rewind, fast forward), plus the duration of playback since the last playback action (e.g., based off of a free running timer or using presentation timestamp differentials from the media player). There are many methods of tracking playback position and progress as should be known to those skilled in the art, it should be understood that any method for determining playback position (i.e., the wall-clock time corresponding to the last playback action) should be suitable for the current invention, for use in calculating current playback wall-clock timestamp. The client also checks to see if the fast forward target wall-clock time is in the future, i.e., beyond the current wall-clock time of the client 110 operating system. If the fast forward target time is not the future, i.e., before the current wall-clock time of the client 110 operating system, processing continues to step 576. If the fast forward target time is the future, i.e., beyond the current wall-clock time of the client 110 operating system, processing continues to step 578, where the client 110 checks to see if the user is already viewing the real-time streaming content. In one embodiment, the client 110 maintains session state regarding whether or not the user is currently viewing the real-time streaming content (denoted by a live streaming flag set to true). In another embodiment, the client 110 always assumes the user is not currently viewing the real-time streaming content (denoted by a live streaming flag set to false). When a fast forward operation occurs that does not result in resuming the real-time stream, the live streaming flag should already be set to false, but may be reset to false for good measure.

In step 572, the live streaming flag is already set to true, then there is no reason to try to resume playback of the real-time streaming content, since the user is already viewing the real-time streaming content, so processing continues to step 580 where the client 110 ignores the request. If the live streaming flag not set to true, processing continues to step 572 where the client 110 sets the target wall-clock timestamp equal to the current wall-clock time of the client 110 operating system and the live streaming flag is set to true. Processing then continues to step 576.

In step 576, the client 110 resets the media player and restarts it with a new master manifest request URL containing the new target wall-clock timestamp, to be handled by the proxy 106.

Figure 6:
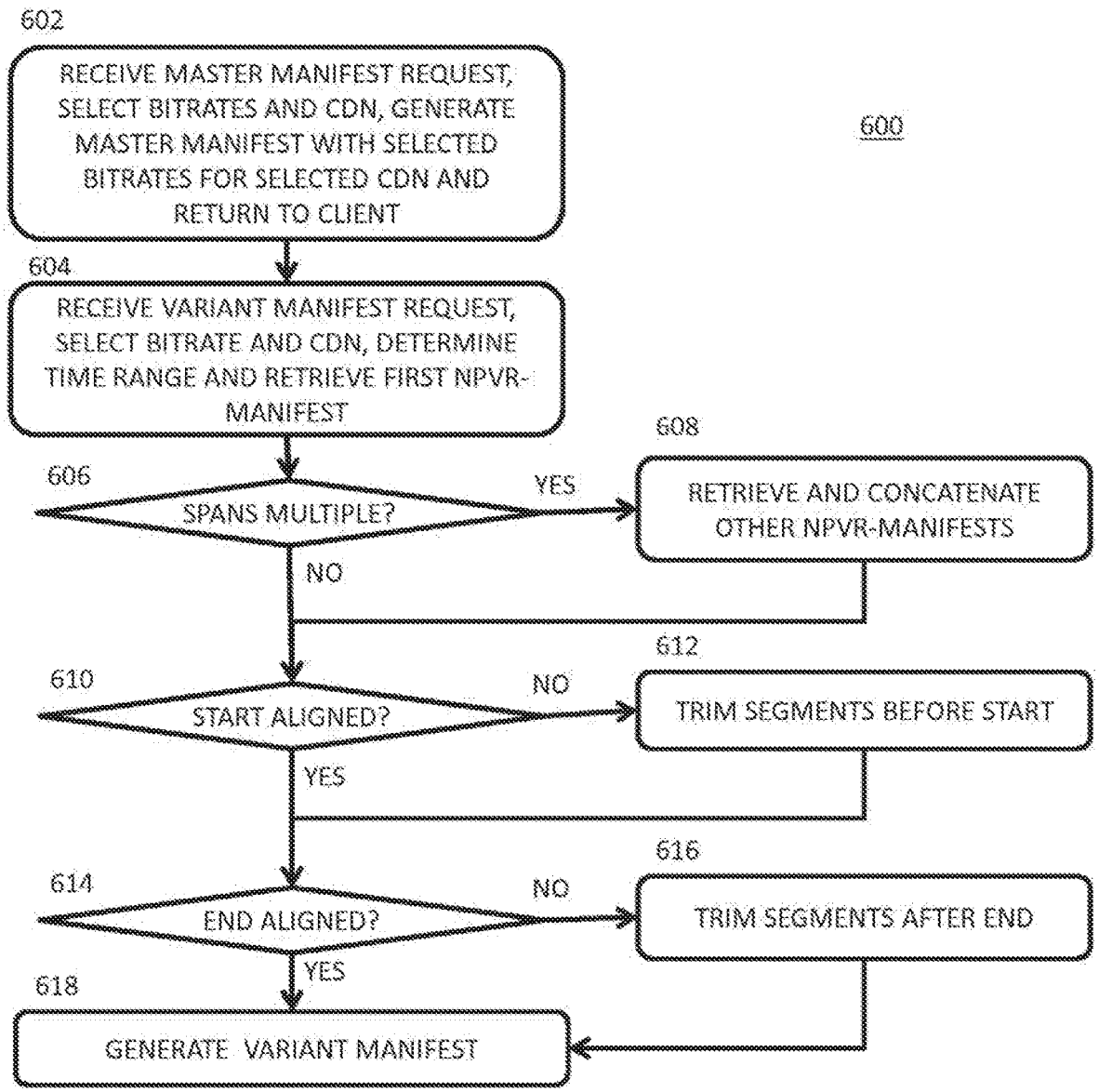
FIG. 6 is a flow chart showing a method for performing VoD content rendering, in accordance with various embodiments.

In FIG. 6 is a flow chart describing a process 600 performed at a proxy 106 for generating VoD manifest files for playback of previously recorded real-time content. In step 602, the proxy 106 receives a request from client 110 for the master manifest. The master manifest contains a list of variant manifest files corresponding to different available bitrates. In one embodiment, the proxy 106 determines the available bitrates based on information provided by the WFM 102. In another embodiment, the proxy 106 determines the available bitrates based on the master manifest produced by the packager 104 and placed in the CDN 108. In one embodiment, the proxy 106 determines a subset of bitrates to present to the client 110. In one embodiment, the set of bitrates is determined based on user restrictions configured for client 110 by the WFM 102. In another embodiment, the set of bitrates is determined based on network restrictions provided by the WFM 102. In another embodiment, the set of bitrates is determined based on the current network load estimated by the proxy 106 based on the aggregate number of manifest requests and their corresponding bitrates seen within a given time window (e.g., the last 30 seconds). The proxy 106 returns the master manifest to the client 110 and proceeds to step 604.

In step 604, the proxy 106 receives a variant manifest request from the client 110, for a specific bitrate. In one embodiment, the proxy 106 chooses a CDN 108 from which the client 110 should retrieve segments. In one embodiment, the CDN 108 is selected based on a strict prioritization provided by the WFM 102. In another embodiment, the CDN 108 is selected based on a round-robin or weighted round-robin scheme where the weights are provided by the WFM 102. In another embodiment, the CDN 108 is selected based on aggregate latency measurements for manifest and/or segment retrievals performed by the proxy 106 within a given time window (e.g., the last 30 seconds). In another embodiment, the CDN 108 is selected based on aggregate bandwidth measurements for manifest and/or segment retrievals performed by the proxy 106 within a given time window (e.g., the last 30 seconds). In one embodiment, the proxy 106 chooses a bitrate to serve to the client 110, where the bitrate may be lower than the bitrate requested by the client 110. In one embodiment, the bitrates is determined based on user restrictions configured for client 110 by the WFM 102. In another embodiment, the bitrate is determined based on network restrictions provided by the WFM 102. In another embodiment, the bitrate is determined based on the current network load estimated by the proxy 106 based on the aggregate number of manifest requests and their corresponding bitrates seen within a given time window (e.g., the last 30 seconds). In another embodiment, the bitrate is selected based on aggregate latency measurements for manifest and/or segment retrievals from the CDN 108 performed by the proxy 106 within a given time window (e.g., the last 30 seconds). In another embodiment, the bitrate is selected based on aggregate bandwidth measurements for manifest and/or segment retrievals from the CDN 108 performed by the proxy 106 within a given time window (e.g., the last 30 seconds). The proxy 106 retrieves the first npvr manifest corresponding to the program start time from the selected CDN 108 for the selected bitrate.

Processing then continues to step 606 where the proxy 106 checks to see if the program spans multiple npvr manifests (i.e., the first npvr manifest retrieved in step 604 does not contain all the segments necessary to create a VoD manifest for the requested program). If the first manifest contains all the necessary segments, processing continues to step 610. If the first manifest does not contain the necessary segments, processing continues to step 608 where the proxy 106 retrieves additional manifest files using the next sequential manifest pointers, concatenating the segment information and removing unnecessary tags as should be familiar to those skilled in the art, before continuing to step 610.

In step 610, the proxy 106 checks to see if the wall-clock timestamp of the first segment in the first npvr manifest aligns with the start time of the program. If the wall-clock timestamps align, processing continues to step 614. If the timestamps do not align, processing continues to step 612 where the proxy 106 trims out those initial segments whose wall-clock timestamps do not overlap with the wall-clock time range of the program (adjusting the encryption key information accordingly, e.g., by selecting the last key specified before the current segment and applying the proper IV as required, as should be familiar to those skilled in the art), before continuing to step 614.

In step 614, the proxy 106 checks to see if the wall-clock timestamp of the last segment in the last npvr manifest aligns with the start time of the program. If the wall-clock timestamps align, processing continues to step 618. If the timestamps do not align, processing continues to step 616 where the proxy 106 trims out those trailing segments whose wall-clock timestamps do not overlap with the wall-clock time range of the program, before continuing to step 618.

In step 618, the proxy 106 uses the remaining segments to generate the VoD manifest file and returns it to the client 110. In one embodiment, if the variant manifest contains advertisement segments, when generating the variant manifest in step 618, the proxy 106 replaces the advertisement segments specified in the npvr manifest(s) with alternate advertisement segments. In one embodiment, the proxy 106 issues one or more requests to the ADM 114 (one for each advertisement) to determine which alternate advertisement(s) to present to the client 110. In one embodiment, the alternate advertisement segment locations are specified by the ADM 114. In another embodiment, the proxy 106 retrieves the alternate advertisement segment locations, for the alternate advertisement(s) specified by the ADM 114, from the WFM 102.

Thus a method is disclosed for processing content to support network personal video recorder functions, including continually performing the steps of (i) acquiring real-time streaming source content containing a program, (ii) transcoding the acquired source content into distinct encodings to create respective content streams, and (iii) segmenting the content streams into segments and uploading the segments to one or more content delivery networks (CDNs) for retrieval and use in rendering the program at a media player;

generating manifests for the program and continually updating the manifests and uploading the updated manifests to the CDNs as the segments are uploaded to the CDNs, the manifests including a master manifest and set of network-personal-video-recorder (npvr) manifests for respective ones of the encodings, the master manifest including references to the set of npvr manifests to enable selection from among the encodings in rendering the program at the media player; and detecting a program boundary of the program in the source content, and in response:

completing a current set of npvr manifests in current directories of the CDNs;

creating new directories in the CDNs and starting a new set of npvr manifests in the new directories; and uploading subsequent segments and npvr manifest updates to the new directories.

The source content may be audio/video content.

The program boundaries may be specified in-band with the content (e.g., SCTE-35 cue tones).

The program boundaries may be specified out-of-band based off of wall-clock times (e.g., SCTE-118, proprietary EPG data, or fixed duration time schedules).

The new directories for each program may have a hierarchical directory structure having distinct hierarchical levels based on the program boundaries, the date and time the program is processed, and respective identifiers of the source stream and encoding.

A new encryption key may be generated for each new program.

An existing encryption key may be carried over to a new program npvr manifest.

The master manifest may be an HTTP Live Streaming master manifest, the segments HTTP Live Streaming segments, and the npvr manifests non-sliding-window variant stream manifests that continuously grow until complete and then are ended with an ENDLIST tag, each npvr manifest including sequential references to all the segments of the program.

The program may span multiple sequential npvr manifests, and the method further include adding pointers to each npvr manifest to identify a sequentially preceding npvr manifest and a sequentially following npvr manifest.

The method may further include detecting advertisement boundaries and including advertisement boundary information in the npvr manifests to identify discontinuities in the content stream.

The advertisement boundaries may be detected based on in-band SCTE-35 cue tones and SCTE-130 placement opportunity information.

The advertisement boundaries may be provided out-of-band based off of wall-clock times.

Comments may be added to the npvr manifests to denote first and last segments that contain the advertisement.

A disclosed method for rendering content, the content available in one or more distinct encodings each including a respective set of sequential segments, includes:

proxying a manifest request from a media player to a content server;

selecting a preferred encoding for requested content to be delivered;

determining a set of npvr manifests required to satisfy the content request and obtaining a selected one of the set of npvr manifests associated with the selected encoding, the npvr manifests specifying locations of segments of the respective encodings;

constructing a variant manifest from the selected npvr manifest; and providing the variant manifest to the media player for use in obtaining the segments of the respective encoding for playback of the content.

The method may further include:

detecting specified segments in the content corresponding to advertisements that may be replaced;

selecting a preferred advertisement server from a plurality of advertisement servers;

querying the preferred advertisement server for an alternate advertisement; and replacing the specified segments in the npvr manifest with segments specified by the preferred advertisement server in a variant stream manifest.

The method may further include:

selecting a preferred content delivery network (CDN) from a plurality of CDNs containing identical content and rewriting segment uniform resource locators (URLs) of an npvr manifest; and replacing a first base URL pointing to an original CDN with a second base URL of the preferred CDN in a variant stream manifest.

A variant manifest may be constructed as a sliding-window variant manifest by adding a new reference to a next segment and removing an existing reference to an earliest segment in a predetermined window of most recent segments.

The content may be live streaming content and the sliding-window variant manifest continually updated as new segments of the live streaming content are generated to function as a live streaming manifest for real-time playback of the live streaming content by the media player.

The continual updating of the sliding-window variant manifest may include:

finding and retrieving a most recent npvr manifest;

if the most recent npvr manifest contains all the most recent segments in the predetermined window, then extracting the segments from the most recent npvr manifest;

if the most recent npvr manifest does not contain all the most recent segments in the predetermined window, then finding a next sequentially preceding npvr manifest and extracting the most recent segments in the predetermined window from both the most recent and next sequentially preceding npvr manifests; and constructing the live streaming manifest from the extracted segments.

The method may further include retrieving updates for the most recent npvr manifest periodically.

The method may further include using a byte range request to limit the amount of data retrieved in subsequent npvr manifest retrievals by requesting only data beyond the byte range of the previous npvr manifest retrieval through the end of file.

The method may further include:

detecting completion of a current npvr manifest;

determining a location for a next sequential npvr manifest; and issuing subsequent requests to the location of the next sequential npvr manifest.

The content may be live streaming content and the sliding-window variant manifest created based on a target segment of a time-shift playback request to function as a time-shifted manifest for time-shifted playback of a portion of the live streaming content by the media player.

The method may further include:

finding and retrieving an offset npvr manifest containing the target segment;

if the offset npvr manifest contains all the most recent segments in the predetermined window, then extracting the segments from the offset npvr manifest;

if the offset npvr manifest does not contain all the most recent segments in the predetermined window, then finding a next sequentially preceding or following npvr manifest and extracting the most recent segments in the predetermined window from both the offset and next sequentially preceding or following npvr manifests; and constructing the time-shifted manifest from the extracted segments.

The method may further include using monotonically increasing sequence numbers in the time-shifted manifest to simulate a continuous streaming playback, while maintaining a mapping between a current time-shifted manifest sequence number and a sequence number of the target segment.

The method may further include restarting the media player and resetting the time-shifted manifest sequence number whenever a new seek operation occurs.

The method may further include restarting the media player and switching to a live manifest file if a seek request goes beyond the most recent segment generated.

The method may further include inserting discontinuity indicators into the time-shifted manifest when the time-shift playback request involves a seek to a new playback position.

Finding the offset manifest may include calculating a relative time from a most recently used segment in a most recently used npvr manifest, and identifying the npvr manifest corresponding to the relative time as the offset manifest.

The offset may be calculated based on a specific user's aggregate playback requests since a last media player restart, the calculation increasing the offset for time watched and fast forward operations, and decreasing the offset for rewind operations.

Constructing the variant manifest as a sliding-window variant manifest may include finding and retrieving multiple most recent npvr manifests to extract all the most recent segments in the predetermined window from the most recent npvr manifests, with the method further including (i) caching most recently completed npvr manifests and (ii) retrieving the most recent npvr manifests from the cached completed npvr manifests.

The method may further include:

finding a proper encryption key to be associated with each segment in the variant manifest;

using the proper encryption key for each segment in the variant manifest; and adjusting initialization vector (IV) information for the proper encryption key to correspond with the each segment in the variant manifest.

The content may be recorded content and a variant manifest constructed as a video-on-demand (VOD) non-sliding-window variant manifest usable for VOD playback of the recorded content by the media player.

The method may further include:

finding and retrieving a first npvr manifest referred to as a start manifest which contains a starting time for the program, and finding a first segment referred to as a start segment in the start manifest, the start segment having a start time most closely preceding a desired program start time;

finding and retrieving a second npvr manifest referred to as an end manifest which contains and ending time for the program, and finding a second segment referred to as an end segment in the end manifest, the end segment having an end time most closely following the desired program end time;

retrieving all npvr manifests corresponding to a time between the start manifest and the end manifest; and constructing the VoD non-sliding-window variant manifest by concatenating all npvr manifests starting with the start manifest and ending with the end manifest, while excluding segments preceding the start segment in the start manifest and segments following the end segment in the end manifest.

The set of npvr manifests may define a program is determined based off of a contiguous wall-clock time range.

The method may further include personalizing the time range based on a specific user's personal recording criteria.

The above methods are usable together and/or independently. They may be realized in respective computerized devices.

While various embodiments of the invention have been particularly shown and described, it will be understood by those skilled in the art that various changes in form and details may be made therein without departing from the spirit and scope of the invention as defined by the appended claims.

What is claimed is:

1. A method for effectuating time-shifted playback operations with respect to a real-time streaming program at a client device, the real-time streaming program processed into one or more distinct encodings each including a respective set of sequential segments, the method comprising:
   receiving a time-shift request from a user of the client device while playing the real-time streaming program;
   responsive to receiving the time-shift request from the user, determining a target wall-clock time for the real-time streaming program on the client device in a manner that depends on a type of the time-shift request from the user; and
   subsequent to determining the target wall-clock time for the real-time streaming program on the client device:
      restarting a media player of the client device, the media player performing;
      generating a new master manifest request containing the target wall-clock time as a new timestamp for restarting the real-time streaming program at a corresponding video position; and
      responsive to receiving a new master manifest, generating one or more variant manifest requests for specifying a particular encoding of the real-time streaming program,
         wherein a variant manifest is provided as a sliding-window variant manifest constructed from the new master manifest based on the target wall-clock time, and
         wherein the sliding-window variant manifest is constructed by adding a new reference to a next segment and removing an existing reference to an earliest segment in a predetermined window of most recent segments.

2. The method as recited in claim 1, further comprising:
   determining that the time-shift request is a pause request; and
   obtaining a current playback wall-clock timestamp with respect to the real-time streaming program and setting the current playback wall-clock timestamp as the target wall-clock time upon restarting the media player.

3. The method as recited in claim 2, wherein the current playback wall-clock timestamp is calculated as a sum of a wall-clock time corresponding to a video position at a last playback action and a time duration of playback since the last playback action.

4. The method as recited in claim 1, further comprising:
   determining that the time-shift request is a rewind request; and
   calculating a rewind target wall-clock timestamp by subtracting a rewind duration from a current playback wall-clock timestamp with respect to the real-time streaming program and setting the rewind target wall-clock timestamp as the target wall-clock time upon restarting the media player.

5. The method as recited in claim 1, further comprising:
   determining that the time-shift request is a fast forward request; and
   calculating a fast forward target wall-clock timestamp by adding a fast forward time duration to a current playback wall-clock timestamp with respect to the real-time streaming program and setting the fast forward target wall-clock timestamp as the target wall-clock time upon restarting the media player.

6. An apparatus for effectuating time-shifted playback operations with respect to a real-time streaming program at a client device, the real-time streaming program processed into one or more distinct encodings each including a respective set of sequential segments, the apparatus comprising:
   a processor; and
   a memory coupled to the processor, the memory containing program instructions for performing the following acts when executed by the processor:
      receive a time-shift request from a user of the client device while playing the real-time streaming program;
      responsive to receiving the time-shift request from the user, determine a target wall-clock time for the real-time streaming program on the client device in a manner that depends on a type of the time-shift request from the user; and
      subsequent to determining the target wall-clock time for the real-time streaming program on the client device:
         restart a media player of the client device;
         generate a new master manifest request containing the target wall-clock time as a new timestamp for restarting the real-time streaming program at a corresponding video position; and
         responsive to receiving a new master manifest, generate one or more variant manifest requests for specifying a particular encoding of the real-time streaming program,
            wherein a variant manifest is provided as a sliding-window variant manifest constructed from the new master manifest based on the target wall-clock time, and
            wherein the sliding-window variant manifest is constructed by adding a new reference to a next segment and removing an existing reference to an earliest segment in a predetermined window of most recent segments.

7. The apparatus as recited in claim 6, wherein the program instructions further comprise instructions configured to:
   determine that the time-shift request is a pause request; and
   obtain a current playback wall-clock timestamp with respect to the real-time streaming program and set the current playback wall-clock timestamp as the target wall-clock time upon restarting the media player.

8. The apparatus as recited in claim 7, wherein the current playback wall-clock timestamp is calculated as a sum of a wall-clock time corresponding to a video position at a last playback action and a time duration of playback since the last playback action.

9. The apparatus as recited in claim 6, wherein the program instructions further comprise instructions configured to:

determine that the time-shift request is a rewind request; and calculate a rewind target wall-clock timestamp by subtracting a rewind duration from a current playback wall-clock timestamp with respect to the real-time streaming program and set the rewind target wall-clock timestamp as the target wall-clock time upon restarting the media player.

10. The apparatus as recited in claim 6, wherein the program instructions further comprise instructions configured to:

determine that the time-shift request is a fast forward request; and calculate a fast forward target wall-clock timestamp by adding a fast forward time duration to a current playback wall-clock timestamp with respect to the real-time streaming program and set the fast forward target wall-clock timestamp as the target wall-clock time upon restarting the media player.

* * * * *